United States Patent
Lukaczyk et al.

(10) Patent No.: US 11,851,174 B2
(45) Date of Patent: *Dec. 26, 2023

(54) GIMBALED THRUSTER CONFIGURATION FOR USE WITH UNMANNED AERIAL VEHICLE

(71) Applicant: FlightWave Aerospace Systems, Santa Monica, CA (US)

(72) Inventors: Trent Lukaczyk, Santa Monica, CA (US); Michael Colonno, Santa Monica, CA (US)

(73) Assignee: FlightWave Aerospace Systems, Santa Monica, CA (US)

( * ) Notice: Subject to any disclaimer, the term of this patent is extended or adjusted under 35 U.S.C. 154(b) by 541 days.

This patent is subject to a terminal disclaimer.

(21) Appl. No.: 16/819,671

(22) Filed: Mar. 16, 2020

(65) Prior Publication Data

US 2020/0346747 A1 Nov. 5, 2020

Related U.S. Application Data

(63) Continuation-in-part of application No. 15/355,679, filed on Nov. 18, 2016, now Pat. No. 10,589,867.
(Continued)

(51) Int. Cl.
| | |
|---|---|
| *B64C 27/52* | (2006.01) |
| *B64D 27/24* | (2006.01) |
| *B64C 27/20* | (2023.01) |
| *B64C 7/00* | (2006.01) |
| *B64D 31/14* | (2006.01) |
| *B64C 39/02* | (2023.01) |

(52) U.S. Cl.
CPC ............ *B64C 27/52* (2013.01); *B64C 7/00* (2013.01); *B64C 27/20* (2013.01); *B64D 27/24* (2013.01); *B64D 31/14* (2013.01); *B64C 39/024* (2013.01)

(58) Field of Classification Search
CPC ........ B64C 2201/027; B64C 2201/042; B64C 2201/108; B64C 2201/162; B64C 27/52; B64C 27/20; B64D 27/24; B64U 10/14; B64U 30/20; B64U 30/29; B64U 40/10; B64U 50/18

See application file for complete search history.

(56) References Cited

U.S. PATENT DOCUMENTS

| | | |
|---|---|---|
| 6,719,244 B1 | 4/2004 | Gress |
| 8,544,788 B1 | 10/2013 | Capper |
| (Continued) | | |

FOREIGN PATENT DOCUMENTS

| | | |
|---|---|---|
| CA | 2693672 | 8/2011 |
| KR | 20140034370 | 3/2014 |

*Primary Examiner* — Philip J Bonzell
(74) *Attorney, Agent, or Firm* — BakerHostetler

(57) ABSTRACT

A vectored thrust control module for an aircraft that includes a servo system that couples to the aircraft structure at an output shaft connection point. A thrust motor assembly is fully supported by the servo system and rotates a bladed component to provide thrust to the aircraft. Further, the thrust motor assembly is rigidly connected with the servo system to rotate together about a longitudinal axis thrust line with respect to the aircraft structure. The bladed component and the thrust motor assembly generate a line of thrust that extends through the connection point of the servo system to the aircraft structure.

19 Claims, 39 Drawing Sheets

SECTION A-A

Related U.S. Application Data

(60) Provisional application No. 62/258,145, filed on Nov. 20, 2015.

(56) References Cited

U.S. PATENT DOCUMENTS

| | | | |
|---|---|---|---|
| 9,938,005 B2* | 4/2018 | Matus | G05D 1/0808 |
| 2009/0283629 A1* | 11/2009 | Kroetsch | A63H 27/12 |
| | | | 244/17.23 |
| 2010/0140415 A1 | 6/2010 | Goossen | |
| 2013/0105620 A1* | 5/2013 | Abde Qader Alzu'bi | |
| | | | B64C 27/20 |
| | | | 244/17.13 |
| 2013/0105635 A1 | 5/2013 | Alzu'bi et al. | |
| 2014/0151496 A1* | 6/2014 | Shaw | B64C 27/52 |
| | | | 244/17.23 |
| 2016/0039300 A1* | 2/2016 | Wang | B64D 27/24 |
| | | | 244/58 |

* cited by examiner

SECTION A-A

GIMBALED THRUSTER CONFIGURATION FOR USE WITH UNMANNED AERIAL VEHICLE

CROSS-REFERENCE TO PRIOR APPLICATIONS

This application is a continuation in part of U.S. patent application Ser. No. 15/355,679, filed Nov. 18, 2016, now U.S. Pat. No. 10,589,867 issued Mar. 17, 2020, which is incorporated herein by reference in its entirety; which application claims the benefit from U.S. Provisional Application No. 62/258,145 filed on Nov. 20, 2015, which is hereby incorporated by reference for all purposes as if fully set forth herein.

TECHNICAL FIELD

The disclosure is related to a thruster configuration for use with an aerial vehicle. More particularly, the disclosure is related to a gimbaled thruster configuration for use with an unmanned aerial vehicle and a method for vectored thrust control.

BACKGROUND

Unmanned Aerial Vehicles (UAVs) are typically flown based on two different flight modes. The first is a multi-rotor flight mode that uses multiple lifting propellers to hover or take off and land vertically by providing generally vertical thrust. The second is a traditional fixed-wing flight mode that uses a large span aerodynamic lifting surface that uses generally horizontal thrust. The multi-rotor flight mode benefits from being easy to launch and land, but it has poor endurance due in part to higher energy consumption. The fixed-wing flight mode is beneficial due to its endurance as a result of lower energy consumption, but it is more difficult to launch and land. There is a new class of "hybrid" aerodynamic vehicles that blend the two strategies to take advantage of their positive attributes.

One hybrid aerodynamic flight strategy is known as a "tilt-rotor", where thrusters are able to rotate to accommodate different flight modes. In the first vertical flight mode, the thrusters point upwards providing vertical thrust in order to fly like a multi-rotor. In the second horizontal flight mode, the thrusters point forward to provide horizontal thrust in order to fly like a fixed-wing aircraft. In each flight mode, the tilting action of the thrusters can be further used to enable greater control. For example, a thruster in the vertical flight mode can be slightly tilted forward or aft to control forward and backward motions.

UAV tilt-rotor mechanisms are difficult to build because they must be tiltable over a large range of motion, while also being durable, light, and consuming minimal power. Some prior art attempts to overcome this required numerous small parts, making them heavy, increasing cost, increasing manufacturing complexity, increasing potential for failure, and/or the like. On the other hand, some prior art attempts that focused on being durable failed because of high power consumption. Additionally, some prior approaches also failed due to the high torque loads various components were exposed to resulting in either over-engineered heavy structures and/or component failure.

Other prior art approaches in the field offer no alternative to utilizing gears and other components to allow for a greater degree of rotation of the servo. In some prior art approaches, a connecting linkage restricts the servo motion to a mere 90 degrees of rotation. In other prior art approaches, an aerial vehicle that separates a load bearing aspect of the vehicle from the servo system became an unfavorable limitation. Further, these added connecting linkage gears and components are prone to fail, break, or stress-out.

Many of these and other shortcomings of the prior art are addressed by the various aspects in the present disclosure.

SUMMARY OF THE DISCLOSURE

In one aspect, the disclosure describes a vectored thrust control module for an aircraft. The aircraft has an aircraft structure that includes a servo system having a motor and an output shaft that couples to the aircraft structure at a connection point. The servo system fully supports a thrust motor assembly, and the thrust motor assembly includes a motor configured to rotate a bladed component and provide thrust. Further, the thrust motor assembly is arranged with the servo system to be rigidly connected and rotatable together about a longitudinal axis thrust line with respect to the aircraft structure. The bladed component and the thrust motor assembly are configured to generate a line of thrust where a center of the line of thrust extends through the connection point of the servo system to the aircraft structure.

In another aspect, the disclosure describes a vectored thrust control module for an aircraft where the aircraft has an aircraft structure that includes servo system encased by a servo housing. The servo system includes a motor and an output shaft, wherein the output shaft is coupled to the aircraft structure at a connection point. The servo system fully supports a thrust motor assembly, and the thrust motor assembly includes a motor configured to rotate a bladed component that in turn is rotating and providing thrust. Further, an adapter plate is directly coupled with the thrust motor assembly and the servo system is configured to be directly coupled to the adapter plate. The thrust motor assembly and the servo system are rigidly connected together and arranged to rotate together with respect to the aircraft structure as well as generate a line of thrust where a center of the line of thrust extends through the connection point of the servo system to the aircraft structure.

In another aspect, the disclosure describes a vectored thrust control module for an aircraft having an aircraft structure that includes a servo system having a motor and an output shaft that couples to the aircraft structure at a connection point. The servo system fully supports a thrust motor assembly, and the thrust motor assembly includes a motor configured to rotate a bladed component and provide thrust. The servo system includes a motor and an output shaft, wherein the output shaft is coupled to the aircraft structure at a connection point; wherein the thrust motor assembly and the servo system are rigidly connected together and are further configured to rotate together with respect to the aircraft structure to generate a line of thrust. A center of the line of thrust extends through the connection point of the servo system to the aircraft structure.

DETAILED DESCRIPTION

The disclosure provides a construction and a method for constructing a UAV tilt-rotor mechanism hereinafter referred to as a "gimbaled thruster". The construction detailed by the disclosure enables a large range of tilting motion by directly connecting a rotary "servo" to both a thrusting device and a primary structure component of the vehicle. Servos are traditionally available in the UAV industry for controlling aerodynamic surfaces and can be built durably for example with multiple bearings and metal gears. The thrusting device or assembly can use a number of implementations, for example a motor driven propeller, a motor driven ducted fan, and the like.

In order to minimize stress in joining parts, and power consumption of the servo, a line of thrust of the thrusting device may be aligned with a hinge point of the servo. Further, this alignment of the line of thrust or center axis location of the thrusting assembly is beneficial because it reduces the lateral and longitudinal torques that an associated connection has to carry. This source of torques in prior art implementations is a recognized problem in the industry. The disclosure seeks to solve this problem, despite combining the load bearing part and servo driving part of the mechanism, by taking advantage of traditional servo construction topologies, for example utilizing servos that include bearings capable of carrying these torques and radial loads.

Several aspects of this method are set forth in the disclosure provided below. One aspect of the disclosure that ties the method and configuration together is a coupling of the servo directly to the aircraft structure and the thrusting device. In this regard, one aspect of the disclosure includes minimizing or removing parts between the servo and the motor such that the servo acts as the rotating body itself. Unlike some prior art, aspects of the disclosure have no control linkage restricting the motion of the servo or other gimbaling components to 90 degrees.

One advantage of the gimbaled thruster construction described by the disclosure is that it advances a holistic performance of a tilt-rotor mechanism. Aspects of the disclosure enable a novel larger range of tilting motion through the drive of a servo system while eliminating many small parts that can compromise durability and add weight. An aspect of the disclosure further optimally aligns the forces of the mechanism to further increase durability and reduce power consumption.

Figure 1:
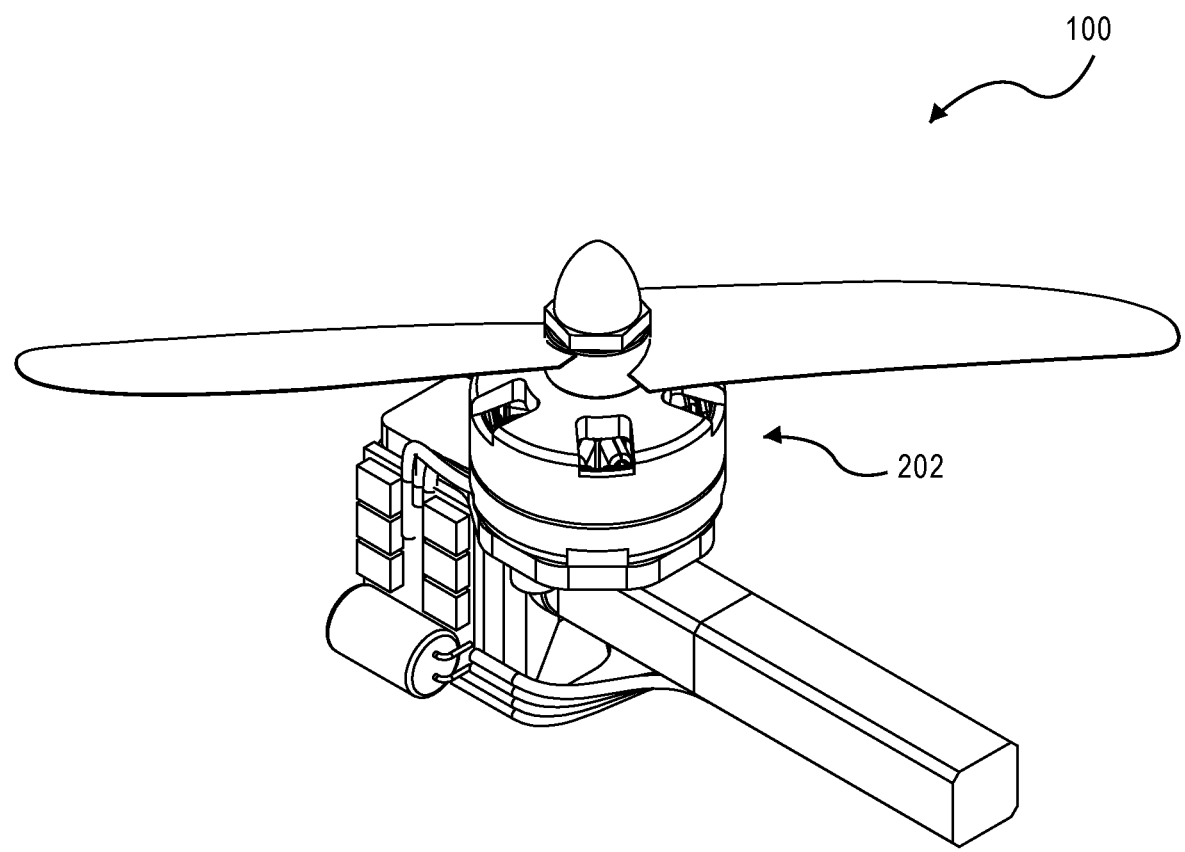
FIG. 1 illustrates a gimbaled thruster in accordance with aspects of the present disclosure.

Now referring to the drawings, wherein like reference numbers refer to like elements, FIG. 1 illustrates an aspect of a gimbaled thruster 100 in accordance with aspects of the present disclosure. FIG. 2 illustrates an exploded view 200 of the gimbaled thruster 100 of FIG. 1. In an exemplary aspect, the gimbaled thruster 100 may embody a vectored thrust control module coupled to an aircraft, unmanned aerial vehicle, or the like for use in horizontal-to-vertical take-off and flight, such as take-off from a landing pad, other locations having little to no runway, or the like.

The gimbaled thruster 100 may include a thrust motor assembly 202 that includes at least one bladed component or propeller 204, a motor 209, and a motor hub 210. The thrust motor assembly 202 may be coupled to a servo system 230 that in turn may be attached to an interface adapter 236 configured for attachment to an aircraft structure 240. Although FIGS. 1 and 2 illustrate a single one of the propeller 204, the disclosure contemplates that the propeller 204 may also be implemented with multiple configurations and/arrangements of the propeller 204, multiple counter-rotating configurations and/arrangements of the propeller 204, a ducted fan (see FIG. 20), and/or like bladed components.

The thrust motor assembly 202 may be assembled into one self-contained and integrated assembly. The motor 209 and the motor hub 210 may be configured to be capable of rotation and may be attached to a motor base assembly 211. The motor 209 of the thrust motor assembly 202 may be configured to include a rotor, winding, commutator, motor stator windings 212, and/or the like. The thrust motor assembly 202 may be configured to rotate the motor 209 and the motor 209 rotates at least one but possibly up to four or more propellers 204, or other bladed components, so that the propeller 204 pushes air and generates thrust.

The at least one propeller 204 may be coupled to a motor shaft 213 of the thrust motor assembly 202 by a fastener 206, such as a hex nut 208. Alternatively, the at least one propeller 204 may use other types of fastening means such as multiple bolts and/or the like. Alternatively, the propeller 204 may be coupled to the motor 209 in a quick fastening construction that may include a push and lock-and-turn, and/or a self-locking assembly that locks the at least one propeller 204 to the motor shaft 213. In yet another aspect, the at least one propeller 204 may be manufactured with the motor shaft 213 embedded therein by over-molding and/or the like.

The thrust motor assembly 202 may include at least two power wires 214 that connect to the motor 209 of the thrust motor assembly 202 to provide power and/or control, or with implementations that include at least three sets of coils arranged in the motor 209 of the thrust motor assembly 202. The coils may be driven by a motor speed controller 250 discussed below. The thrust motor assembly 202 can be manufactured by any suitable process such as, but not limited to, machining, molding, an extrusion process, an additive process and/or the like.

Further, the motor base assembly 211 may connect to a motor mounting adapter plate 216. In one aspect, the motor mounting adapter plate 216 may be configured to accept a motor shaft 213 of the thrust motor assembly 202. The motor mounting adapter plate 216 may include at least one hole 218, 219 or bore to accept at least one fastener 220, such as a bolt, to hold, connect, and stabilize the thrust motor assembly 202. A central configuration or implementation of the hole 219 may act as a clearance hole so that a motor shaft 213 and a retaining clip on the thrust motor assembly 202 may sit far below a surface of the motor mounting adapter plate 216 so that there is no interference with the motor mounting adapter plate 216. Importantly, a direct integration of the motor mounting adapter plate 216 to the motor base assembly 211 affords a greater range of motion to the overall assembly.

In another contemplated aspect, the motor base assembly 211 couples directly with a servo housing 232 that fully integrates a motor shaft receptacle functionality of a motor mounting adapter plate 216. This direct coupling with an integrated servo housing 232 negates the need for a mounting plate, removes a potential failure point, and increases manufacturing capabilities.

An adhesive 242, for example glue, may be utilized to rigidly connect the motor mounting adapter plate 216 with the servo system 230. In one aspect, the adhesive 242 detachably connects the motor mounting adapter plate 216 to the servo system 230. In another aspect, the servo system 230 and the motor mounting adapter plate 216 are formed as one undetachable unit. A means to self-cool the system in flight, for example when the servo is operational, may involve a specific configuration and/or composition of the adhesive 242. The adhesive 242 may connect the servo system 230 with the motor speed controller 250. The adhesive 242 may include a composition to withstand heat being produced and released by both the servo system 230 and the motor speed controller 250. When the motor speed controller 250 is attached directly to the servo system 230, the adhesive 242 may be a heat conductive adhesive or glue that may need to be not temperature sensitive, to use the servo housing 232 as an additional heat dissipating surface.

The servo system 230 may include a motor, a travel sensor configured to communicate to the motor how far to tilt or travel forward and backward, a gear train, an electronic controller, a housing, and the like. An aft end of the servo housing 232 may include a servo output shaft 234, a mating frame receptacle 233 for the servo output shaft 234, and the interface adapter 236. The servo output shaft 234 may connect with the interface adapter 236 that acts as a variable connection point with an aircraft structure interface. These serve to allow for any type of contemplated mounting to an aircraft structure 240. More specifically, the servo output shaft 234 acts as a single connection for the thrust motor assembly 202 to the aircraft structure 240. In configurations especially useful to this aspect, the servo system 230 may also include one or more bearings or pivots. The bearings/pivots in the servo system 230 may be configured to withstand high amounts of torque during take-off and flight. This disclosure specifically contemplates a novel approach to combining and arranging the load bearing and servo driving aspects of an unmanned aerial vehicle.

The servo of the servo system 230 may include the interface adapter 236 with a countersunk hole that accepts the servo output shaft 234 so as to provide a sealed and/or rigid connection. Further, a hole may be arranged on an opposite end of the interface adapter 236 to accept at least one fastener 220, such as a bolt, which may also be countersunk. Such a connection may functionally allow for absorption of torque and moments, as well as form a more rigid connection with the servo system 230 components and a servo housing 232. This type of connection makes any interface for the servo system 230 with the aircraft structure 240 substantially more rigid.

The dimensional length of the output shaft adapter may be constructed in proportion to a dimensional length of the propeller 204 so to not interfere. The disclosed construction of the interface adapter 236 is beneficial because it allows for connection with the at least one fastener 220 to hold the servo system 230 and attach it to the aircraft structure 240, for example, into the aircraft structure 240 such as a piece of wood associated with the aircraft structure 240.

The servo system 230 may be powered and controlled through a wire assembly connection 258 that connects the servo system 230 to a motor speed controller 250. The motor speed controller 250 may be configured to control the vectored thrust control and power of the servo via an associated attached or integrated power conditioning circuit 260, as well as control the motor 209 and speed associated with the servo system 230. Any contemplated configuration of the wire assembly connection 258 is configured to rotate with the assembly through any degree of rotation. The motor speed controller 250 or electronic speed control (ESC) may also include a motor speed control circuit board or associated integrated power conditioning circuit 260. ESC components 252 may include a voltage regulator, a capacitor 254, and/or the like and the components may be arranged on the tilting assembly. The voltage regulator may be integrated with the ESC or alternatively may be a separate component. In one aspect, the voltage regulator may be configured to provide power to the servo system 230.

Figure 2A:
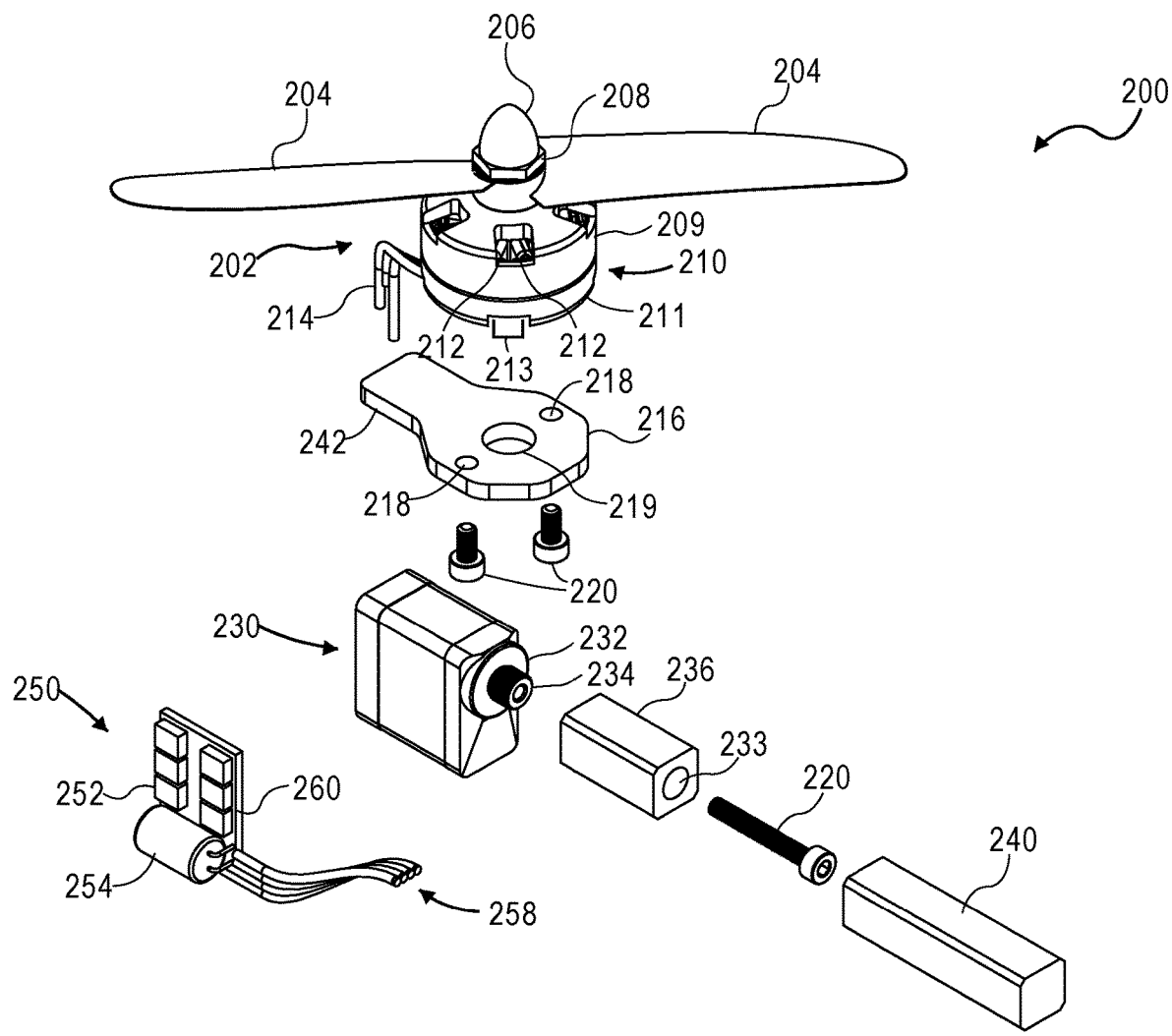
FIG. 2A illustrates an exploded view of the gimbaled thruster of FIG. 1.
Figure 2B:
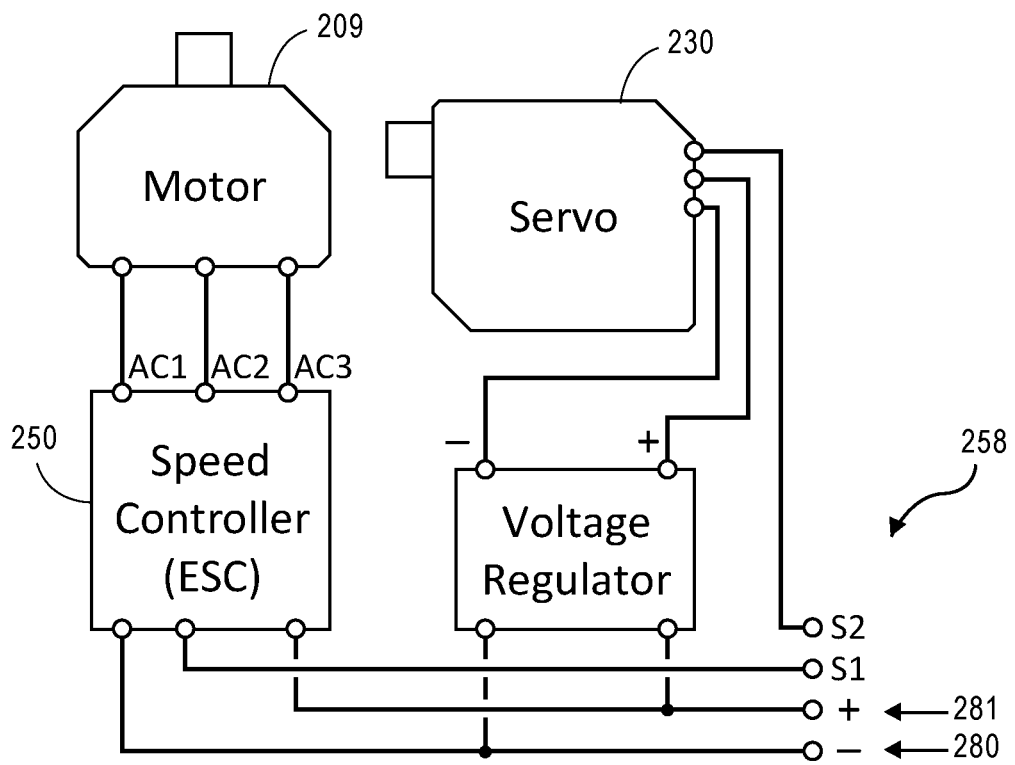
FIG. 2B illustrates a diagram of electrical components and wiring system in accordance with aspects of the present disclosure.

FIG. 2A (as well as referencing FIG. 2B) illustrates a diagram of certain electrical components and a wire system of the vehicle in accordance with aspects of the present disclosure. Such circuitry may be utilized to control the operation of desired speeds and flight modes. In one aspect the wire assembly connection 258 may include two wires dedicated to connecting to and providing power to the servo system 230 through a positive power wire and negative power wire. The wire assembly connection 258 may include a third wire S1 configured as a signal wire to communicate to the motor speed controller 250, such as how fast to command the motor speed. The wire assembly connection 258 may include a fourth wire configured as a signal wire S2 for the servo to command the servo system 230 by how much to tilt, gimbal and turn for a vertical flight mode, horizontal flight mode, a transitional flight mode or the like.

Specifically referencing FIG. 2A, the ESC may include input terminals and output terminals. Two power wires, a positive and negative power wire 280, 281, may connect from the motor speed controller 250 to the servo system 230 and a voltage regulator. These power wires supply and power the voltage regulator and ESC or the motor speed controller 250. The ESC converts that power input into an alternating current which is transmitted to the motor 209 over three wires, AC1, AC2, AC3. However, any number of wires may be utilized. The motor 209 thus may have a 3-phase driving signal generated by the motor speed controller 250. To control the signals to the motor 209, the S1 terminal provides an oscillating and pulse signal to communicate to the ESC how fast to operate the motor 209. A high voltage output command may operate the motor 209 faster, and a low voltage output command may operate the motor 209 slower. A separately commanded signal is fed through S2 which commands the servo system 230 to a particular degree of rotation of tilt during flight. By varying the width of the signal, an autopilot algorithm feature can command various tilt angles of the servo system 230 through 180 degrees of motion. It is further contemplated that the system electrical energy is scalable, for example contemplating electrical energy from 50-100 W (Watts) or even to 1000 W.

Figure 3A:
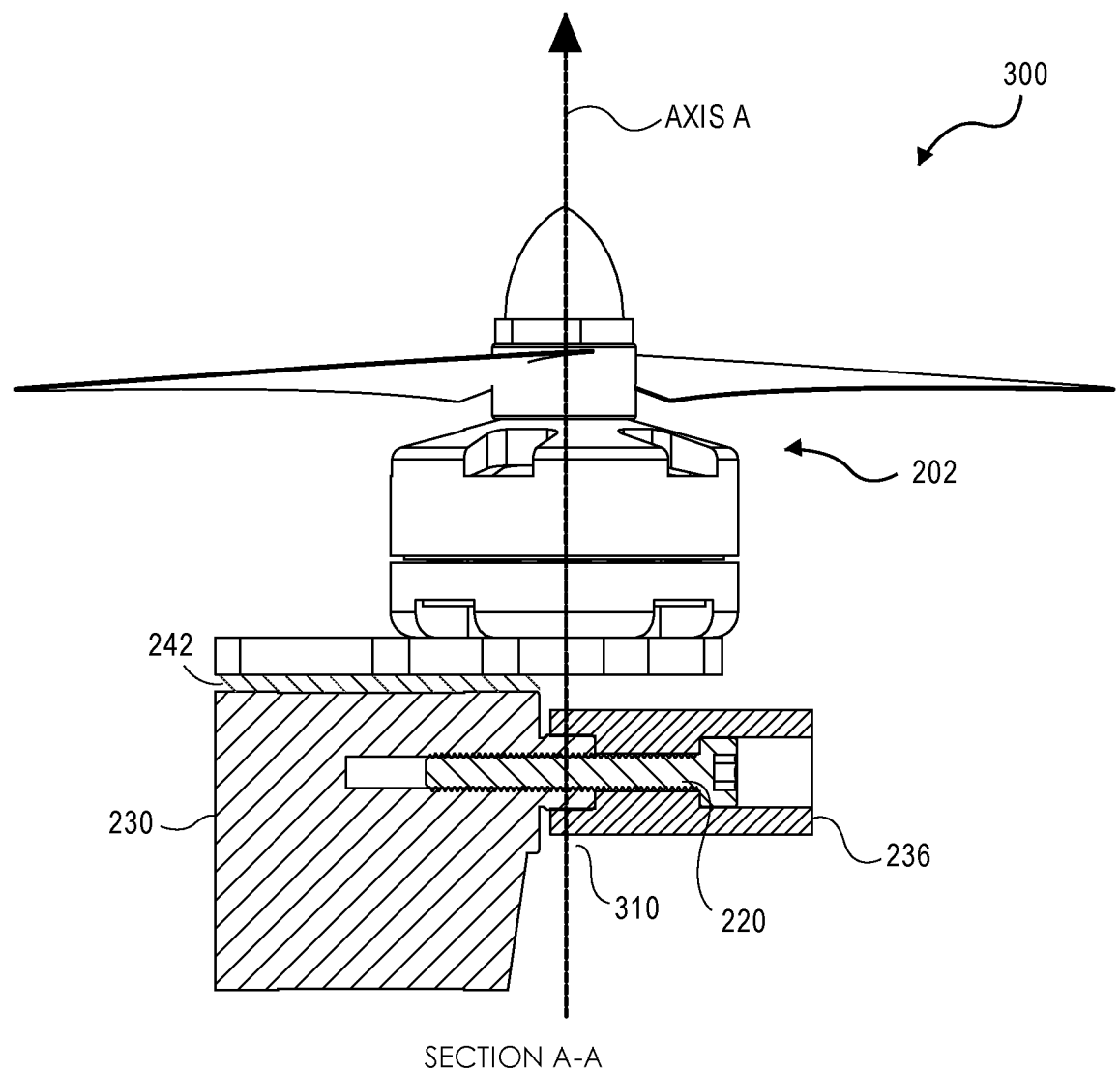
FIG. 3A illustrates a cross-sectional view of the gimbaled thruster of FIGS. 1 and 2 in accordance with aspects of the present disclosure.
Figure 3B:
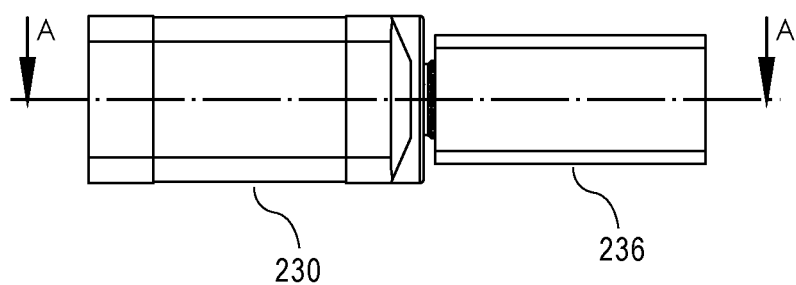
FIG. 3B illustrates a side view of the gimbaled thruster of FIGS. 1 and 2 in accordance with aspects of the present disclosure.

FIG. 3A illustrates a cross section view of the servo shaft mounting 300. Specifically, a center axis thrust line, represented by axis A, of the thrust motor assembly 202 is in close proximity to the hinge or joint 310 of the interface adapter 236 and the servo output shaft 234. Minimizing a moment and torque on an aerial structure is beneficial to a longevity and a durability of the aircraft. This disclosure contemplates a beneficial placement of a center axis of the thrust line of the thrust motor assembly 202 to minimize extraneous torques carried across the joint 310 or hinge. The axis of the thrust line may be located near or at a center of the assembly to withstand high torque loads. Also, extraneous torque may be absorbed through a sufficiently fastener structure such as long bolt shaft retained in the frame member. Also, extraneous torque may be absorbed through strategic placement of the hinge point and thrust line, represented by axis A. The axis of the thrust line acts as a line of action between two load-bearing pivots and is further aligned with a natural hinge point or the joint 310 of the servo system 230 or may be located at a pivot line between two load-bearing pivot points. In one aspect, the axis of the thrust line may be located at a pivot line of servo load-bearing aspect of the aerial vehicle.

In another aspect, there may be two bearings/pivots housed inside the servo system. Unlike some prior art approaches, the contemplated aerial structure can utilize those pivot points already existing as the servo system becomes a loadbearing aspect of the disclosure. This configuration may further enable a range of motion of the servo system 230 such that the aerial vehicle can rotate in small rotation intervals as well as uniquely handle larger rotations. Small rotations, for example, contemplate a 0-20 degree rotation, while larger rotation includes a rotation capable of 180 degrees rotation or as limited by the mechanical limits of the servo system 230.

FIGS. 4-7 illustrate the opposed titling about an axis line of a gimbaled thruster in accordance with aspects of the present disclosure. The aerial vehicle ultimately is capable of taking-off like a helicopter with no need for a runway. This disclosure distinguishes from prior art approaches in that the thrust motor assembly 202 is configured to tilt with a large range of motion. Historically, a shortcoming with prior art approaches was that the servo was connected via a control linkage and that restricted motion to 90 degrees. However, the thrust motor assembly 202 of the disclosure can gimbal through at least a 90 degree rotation and up to 180 degree rotation, allowing for novel and precise control of desired small and large degrees of rotational motion.

There may be a microcontroller device (not pictured) that may be configured to send a modulation signal to command the thrust motor assembly 202 to orient to a desired flight mode position. The microcontroller device may be configured to implement a control algorithmic logic that takes advantage of the improvements of this disclosure to seamlessly blend the two major flights states hover and forward flight with a transition state in between. During the transition state, an autopilot may command the servos to tilt the motors 209 partially forward to initiate forward flight, and when moving sufficiently fast, can command the servos to tilt fully forward to establish full forward flight. In one aspect, the autopilot may be implemented by a processor.

Figure 4:
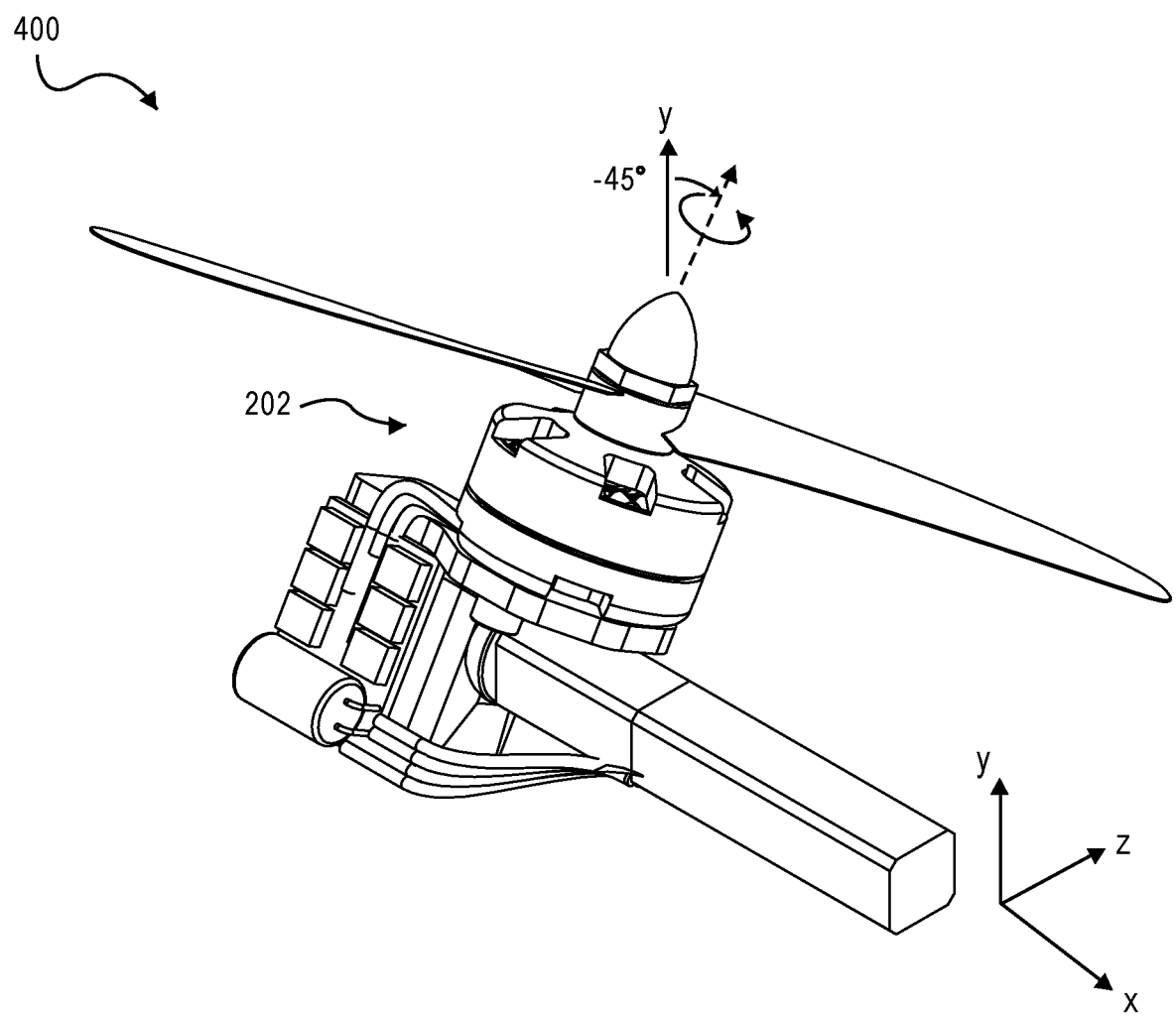
FIGS. 4, 5, 6, and 7 illustrate various opposed titling angles about an axis line of a gimbaled thruster in accordance with aspects of the present disclosure.
Figure 5:
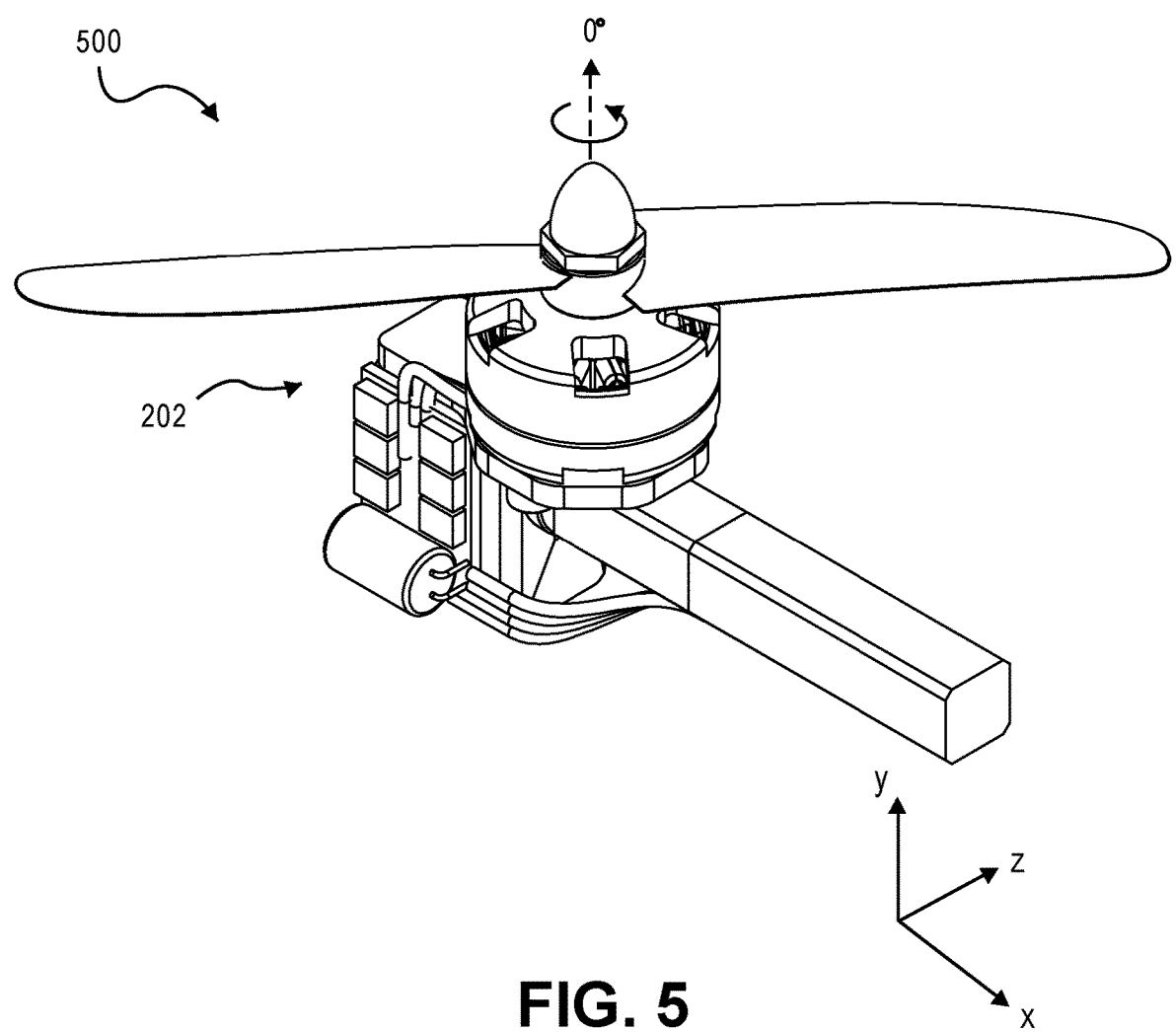
Figure 6:
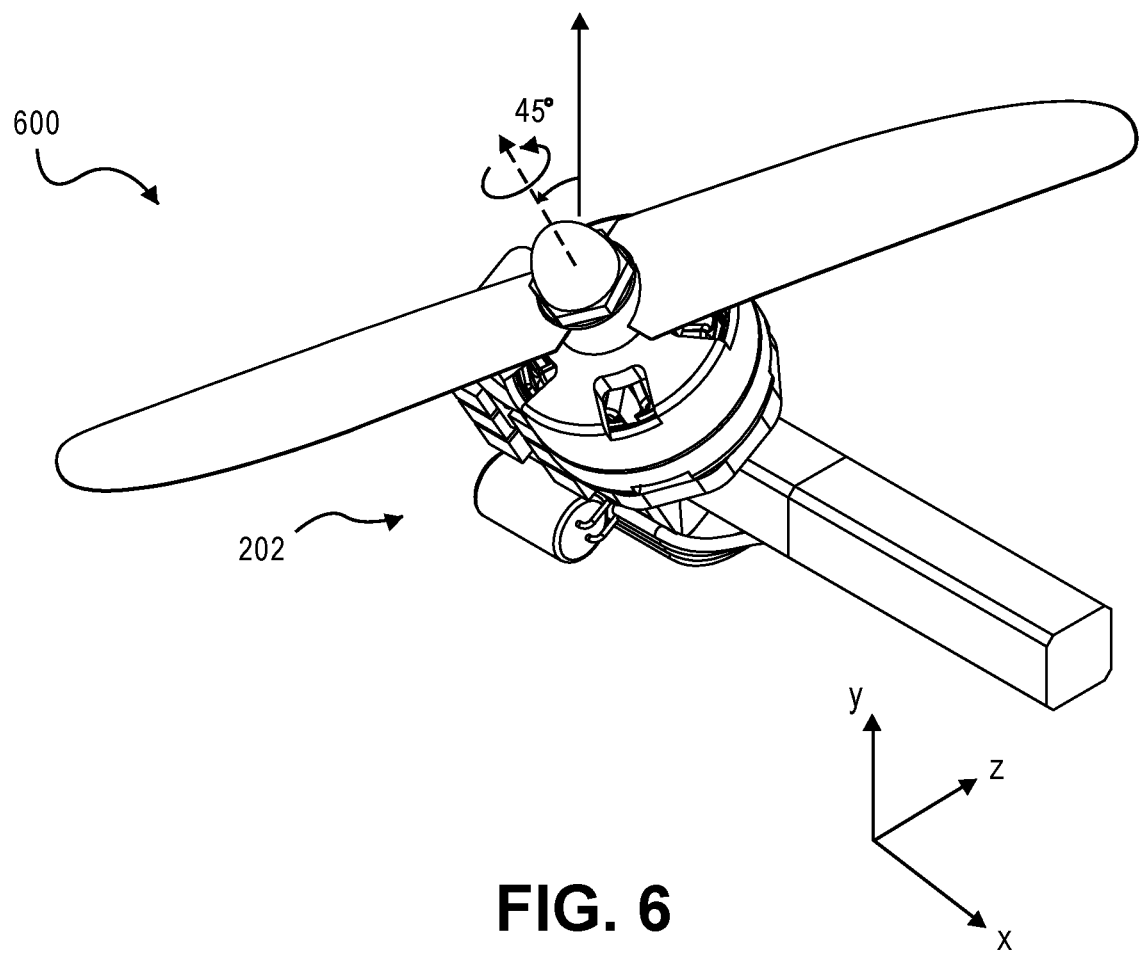
Figure 7:
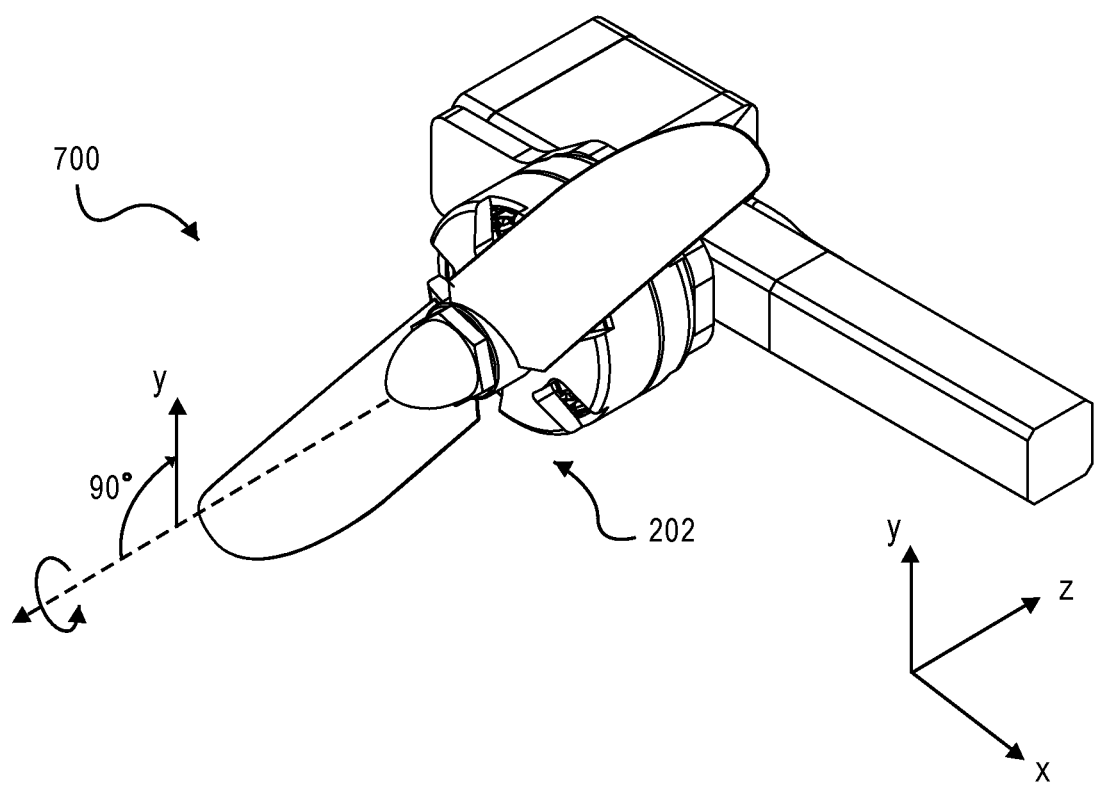

At a certain auto programmed altitude, or with pilot input, the vehicle may transition from horizontal flight mode to vertical flight mode, or vice versa. In the first vertical flight mode, the thrust motor assembly 202 points upwards providing vertical thrust in order to fly like a multi-rotor. In the second horizontal flight mode, the thrust motor assembly 202 points forward to provide horizontal thrust in order to fly like a fixed-wing aircraft. Employing an x-y-z axis into the plane of the drawings, FIG. 4 illustrates a gimbaled thruster tilted at −45 degrees as indicated by reference numeral 400. FIG. 5 illustrates a gimbaled thruster tilted pointing upwards at 0 degrees as indicated by reference numeral 500. FIG. 6 illustrates a gimbaled thruster tilted at +45 degrees as indicated by reference numeral 600. FIG. 7 illustrates a gimbaled thruster tilted at +90 degrees, pointed forward as indicated by reference 700. FIGS. 4-6 illustrate orientation before flight, i.e. during take-off and vertical lift. FIG. 7 illustrates an orientation during a horizontal flight mode. Other orientations are contemplated as well where thrusters are able to rotate to accommodate different flight modes.

Figure 8:
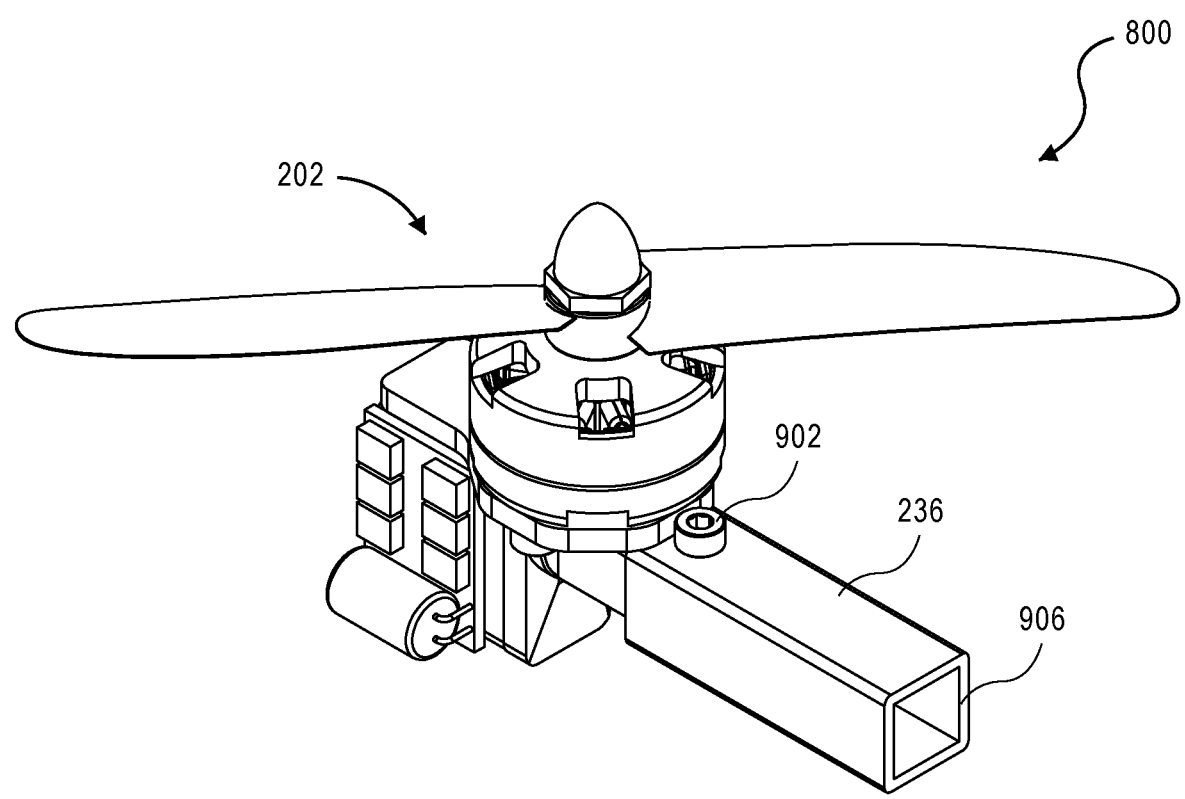
FIG. 8 illustrates a construction of an output shaft adapter for a gimbaled thruster in accordance with aspects of the present disclosure.

FIG. 8 illustrates an aspect of gimbaled thruster with another adapter interface construction in accordance with aspects of the present disclosure in an operational configuration 800. In this aspect, a gimbaled thruster utilizes a shear pin mounting assembly or alternatively a snap-latch mounting method of assembly. Other types of assembly are contemplated as well.

Figure 9:
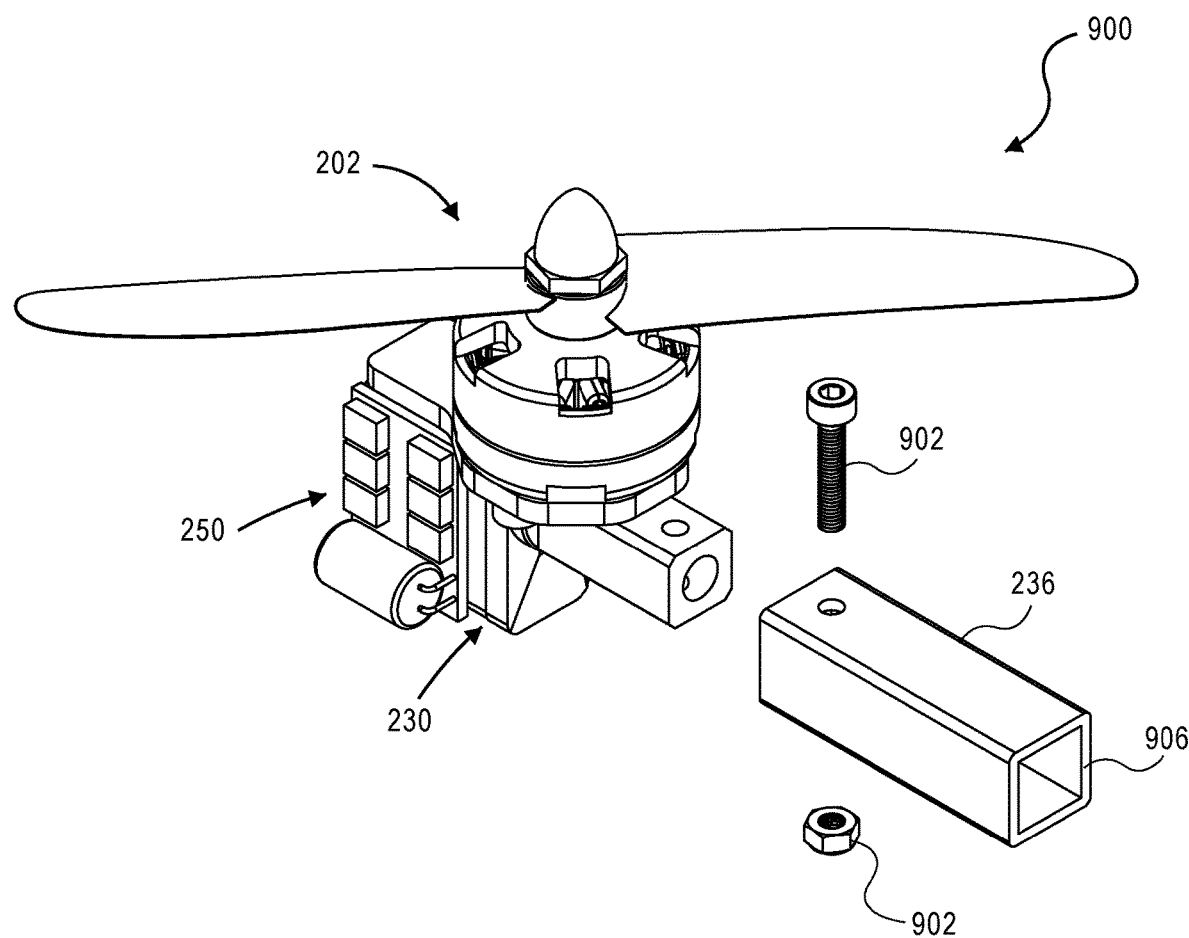
FIG. 9 illustrates an exploded view of the gimbaled thruster of FIG. 8.

FIG. 9 illustrates an exploded view 900 of the gimbaled thruster of FIG. 8. The interface adapter 236 may contain a bore or fastener hole that acts as a fastening means or snap latch for a primary aircraft interface 906. The snap latch retains an inserted aircraft structure part or a mating primary structure (not pictured) into a receptacle, much like an inner and outer tube fastening together. Alternatively, this construction inserts a frame receptacle into a mating primary aircraft interface 906 component and retains it in place via a fastener 902, for example a shear pin, bolt, or the like.

Figure 10:
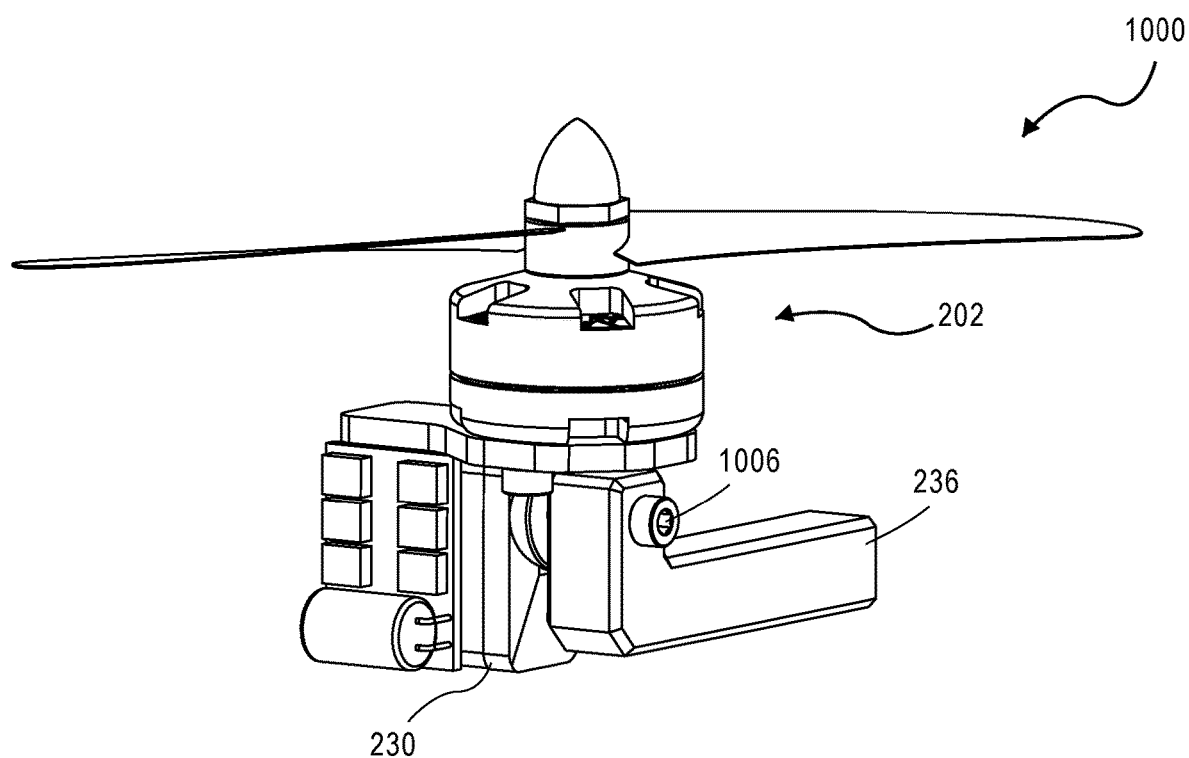
FIG. 10 illustrates a construction of an output shaft adapter for a gimbaled thruster in accordance with aspects of the present disclosure.
Figure 11:
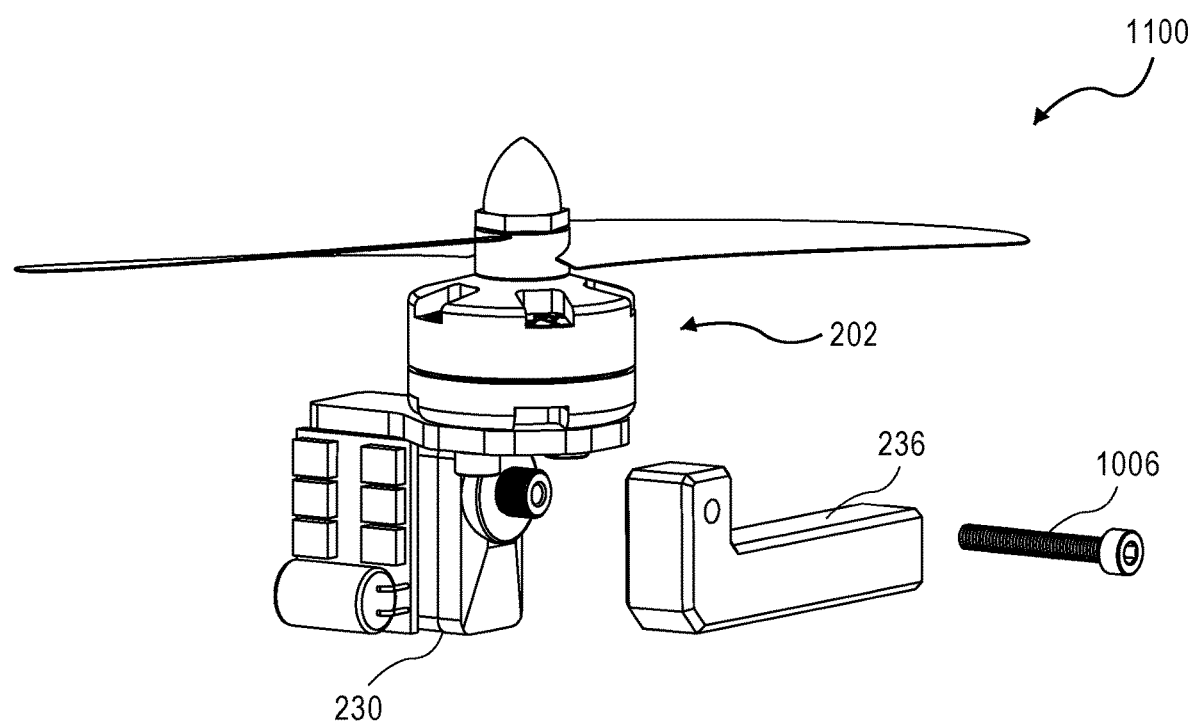
FIG. 11 illustrates an exploded view of the gimbaled thruster of FIG. 10.

FIG. 10 illustrates another aspect of an output shaft adapter for a gimbaled thruster in accordance with aspects of the present disclosure and operational configuration 1000. FIG. 11 illustrates an exploded view 1100 of the gimbaled thruster of FIG. 10. Referring to both FIGS. 10 and 11, the interface adapter 236 in this aspect is an L-shaped arm that connects with the servo system 230 with a mechanical fastener 1006. In effect, the interface adapter 236 raises a position of the servo system 230 up so that the propeller 204 can tilt further back before it interferes with the interface adapter 236. In this contemplated aspect, the interface adapter 236 departs the servo system 230 in the same plane that the motor 209 rotates. Functionally, if the thrust motor assembly 202 tilts back too far, the blades or propeller 204 would interfere with the interface adapter 236 of the aircraft structure 240. The direction that the L-shaped configuration of the interface adapter 236 is arranged mitigates a naturally occurring interference from a blade of the propeller 204.

Referencing FIGS. 1-11, in one contemplated aspect, any one of the operational configurations may be designed with an aerodynamic shaped shroud or fairing design shroud (illustrated in FIGS. 31-37) arranged around the servo system 230 that acts as an aerodynamic shield to the servo system 230, and as such, the structure provides a reduced coefficient of drag so as to create a more clean flight path profile, which reduces aerodynamic drag, reduces thrust needed to maintain a desired flight envelope, increases efficiency, range, endurance, and/or the like. In another contemplated aspect, any one of the operational configurations may be designed with an aerodynamic shaped shroud or fairing design shroud (illustrated in FIGS. 31-37) that acts as a shield to the thrust motor assembly 202, and as such there is a reduced coefficient of drag so as to create a more clean flight path profile, which reduces aerodynamic drag, reduces thrust needed to maintain a desired flight envelope, increases efficiency, range, endurance, and/or the like. In one aspect, the aerodynamic shaped shroud may be manufactured utilizing three-dimensional printing.

Figure 12:
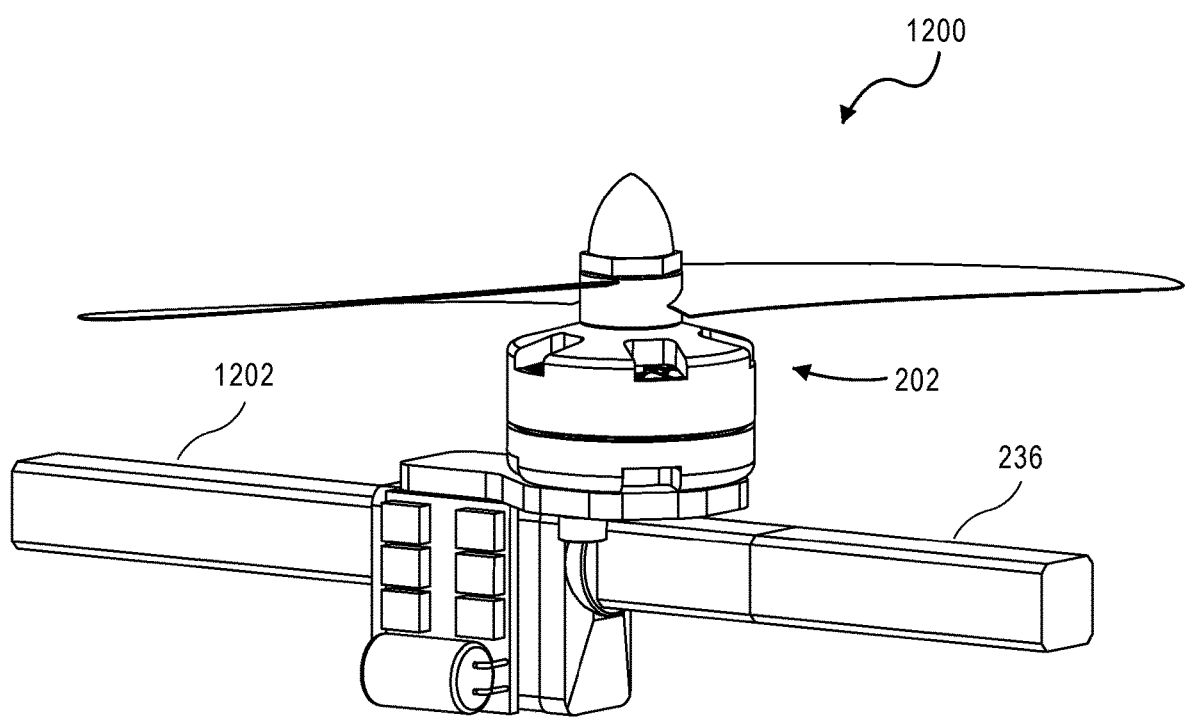
FIG. 12 illustrates a construction of an output shaft adapter for a gimbaled thruster in accordance with aspects of the present disclosure.
Figure 13A:
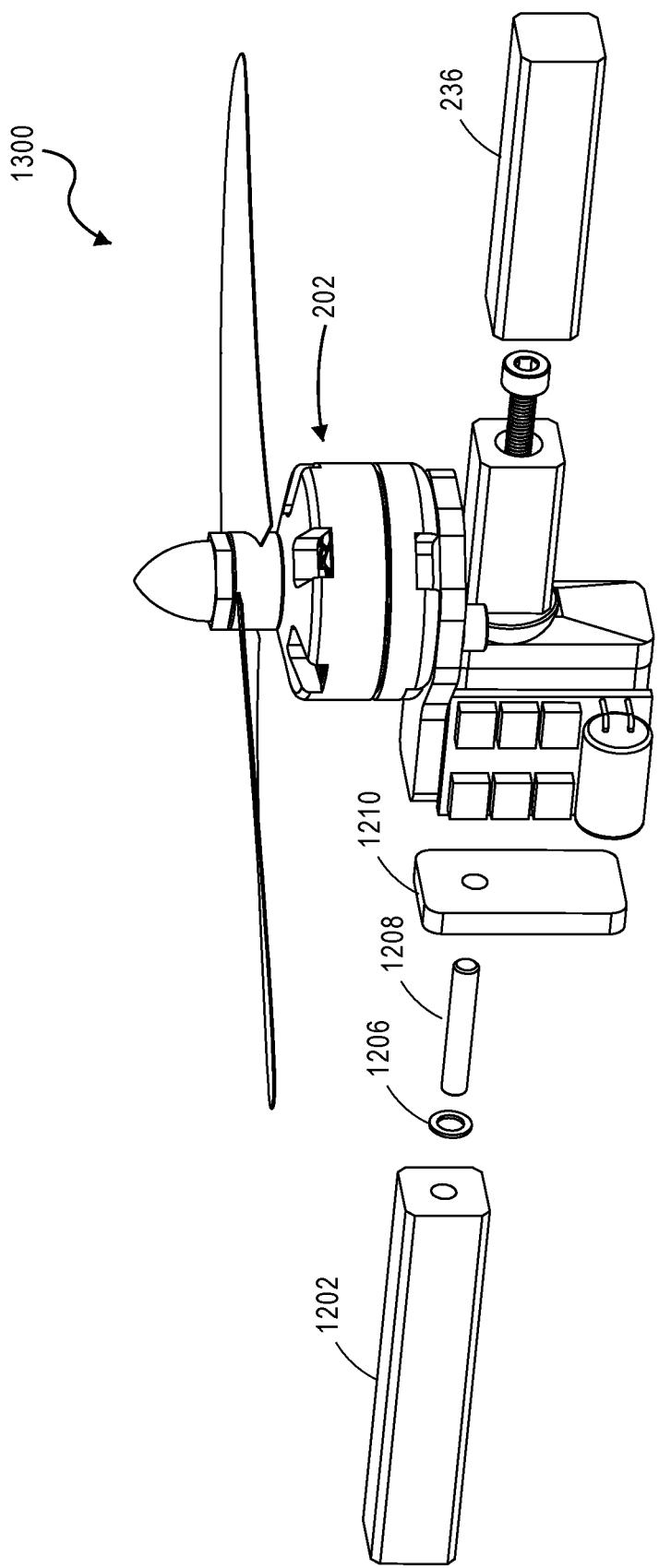
FIG. 13A illustrates an exploded view of the gimbaled thruster of FIG. 12.
Figure 13B:
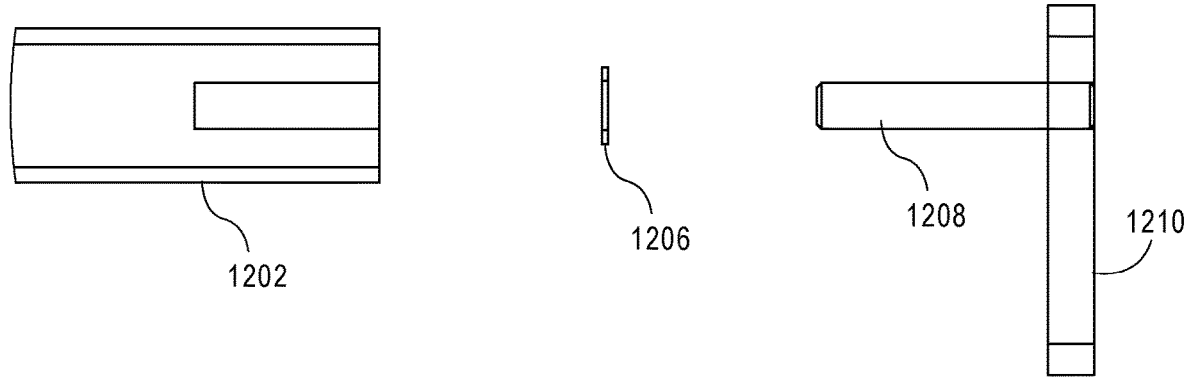
FIG. 13B illustrates a cross-sectional view of the gimbaled thruster of FIG. 12.

FIG. 12 illustrates another aspect of a secondary shaft adapter 1202 (also referred to as an arm) for a gimbaled thruster with two mounting arms in accordance with aspects of the present disclosure, as indicated by reference numerals 1200. FIGS. 13A and 13B further illustrate exploded and cross-sectional views 1300 of FIG. 12. A supporting arm may include a bearing and the secondary shaft adapter 1202 that may serve to carry the torque produced by the servo system 230. Functionally the thrust motor assembly 202 and the propeller 204 may prevent a cantilever situation with a secondary shaft adapter 1202 that may assist to provide balance and stability to the servo system 230. This construction further acts to prevent unwanted pivoting at various connection points on the structure.

A mounting plate 1210 may be adhesively attached to a bare end of the servo system 230 by a fastening means 1208, for example, a pivoting pin and a side-thrust washer 1206. The fastening means 1208 may be able to cleanly rotate into the secondary shaft adapter 1202. It is contemplated in this aspect that there may be multiple thrust motor assemblies 202 aligned in parallel by means of connection shafts similar to 1202. The bare end of the servo system 230 may be supported with a pivoting capability that is integrated with a second primary structure component.

Figure 14:
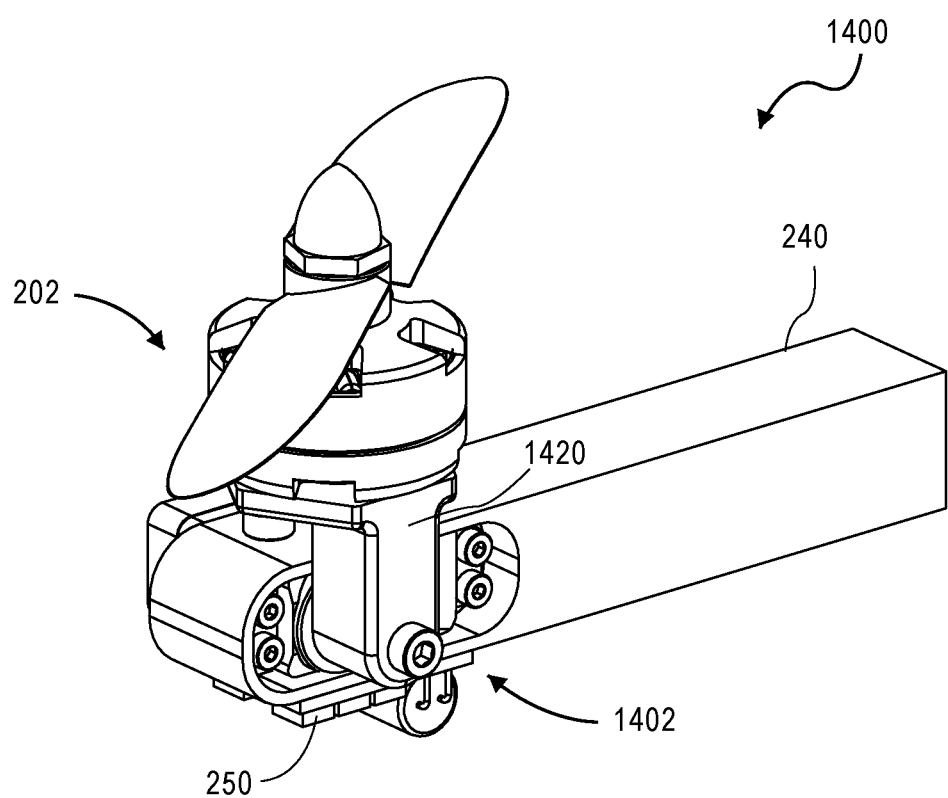
FIG. 14 illustrates an aspect of a gimbaled thruster primary aircraft interface construction in accordance with aspects of the present disclosure.

FIG. 14 illustrates an aspect of a gimbaled thruster primary aircraft interface and stationary implementation and/or configuration of the servo system 230 design in accordance with aspects of the present disclosure, as indicated by reference numeral 1400. The aircraft structure 240 may be designed with an aerodynamic shape such that there is a reduced coefficient of drag such that the atmosphere creates a clean flight path profile and that acts as a shield to the servo system 230, which reduces aerodynamic drag, reduces thrust needed to maintain a desired flight envelope, increases efficiency, range, endurance, and/or the like. A pivoting assembly 1402 acts as a pivoting interface for the servo system 230 and the thrust motor assembly 202. The pivoting assembly 1402 may include a rotatable output shaft on the servo system 230 pivotably coupled to the servo system output arm 1420 to allow for full pivoting and rotation about the aircraft structure 240.

Figure 15:
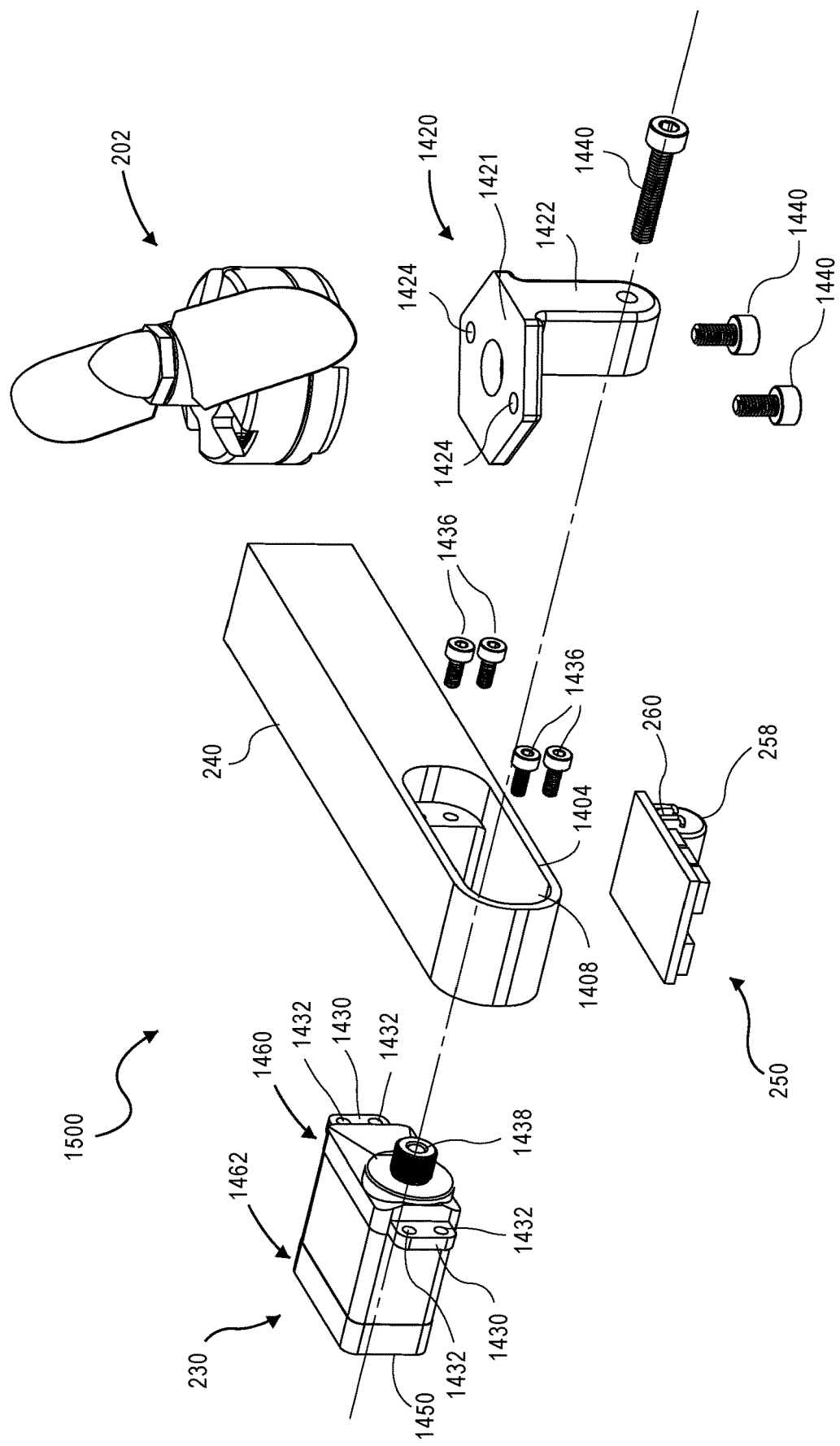
FIG. 15 illustrates an exploded view of the gimbaled thruster of FIG. 14.

FIG. 15 illustrates an exploded view 1500 of the gimbaled thruster of FIG. 14. In one aspect, the aircraft structure 240 may contain a receptacle 1404 that may be an integrated part of the aircraft structure 240. The aircraft structure 240 acts as a type of faring that may be capable of housing non-aerodynamic parts such as the servo system 230, the motor speed controller 250, and/or other components of the system during take-off and landing. In another aspect, it is contemplated that the servo system 230 or the motor speed controller 250 may not both be housed on the inner portion of the receptacle 1404, rather just one or the other. The aircraft structure 240 may have a rounded end. The thrust motor assembly 202 may attach to the servo system output arm 1420 that may pivotally attach the servo system 230 at a servo output shaft 1436. The servo system output arm 1420 may include a motor base plate 1421 that allows for a thrust axis (See FIG. 16) of the motor to be located in a favorable location for absorbing moment and thrust.

The servo system output arm 1420 may include a mounting arm 1422 that attaches to the motor base plate 1421 to provide a predetermined clearance between the thrust motor assembly 202 with the servo system 230 by the pivoting assembly 1402 configuration. The servo system output arm 1420 may include bores 1424 to allow for various fasteners 1440, such as fastening bolts, pins, rivets, and/or the like. The pivoting assembly 1402 may be further configured such that the servo system 230 may rotate with a minimum of 115 degrees of rotation.

The servo system 230 may include at least one mounting tab 1430 configured to mount either to the receptacle inner wall 1408 and/or with fasteners 1440 to the servo system output arm 1420. The at least one mounting tab 1430 may contain bored holes 1432 for accepting servo mounting tab fasteners or other fastening components. The servo system 230 may have an upper bearing 1460 and a lower bearing 1462. These bearings may be metal and/or may be plastic with contact surfaces that contact one another.

The servo system 230 may also house a control circuit of the motor speed controller 250. The control circuit of the motor speed controller 250 may include a sensing unit to receive, convert, and send signals. Also, the control circuit of the motor speed controller 250 may have a control loop with a motor and sensor with a potentiometer or similar sensor. The potentiometer may act like a variable resister that is configured to measure the angle of rotation and a potentiometer (a variable resistor) to measure orientation and extent of the motor rotating and tilting. The potentiometer may further sense disturbances in flight or around a target. The control circuit of the motor speed controller 250 may be configured to interpret a command signal coming from the autopilot and then translate that command signal to then control and drive the motor 209.

The motor speed controller 250 may be mounted on the underside of the aircraft structure 240 and, among other things, provide for powering and communicating with the servo system 230 as described above. In this aspect, the associated cable system or the wire assembly connection 258 that attaches with a stationary implementation and/or configuration of the servo system 230 may not need as many individual wires as opposed to when the servo system 230 is configured for gimbaled rotation discussed in other aspects.

Figure 16:
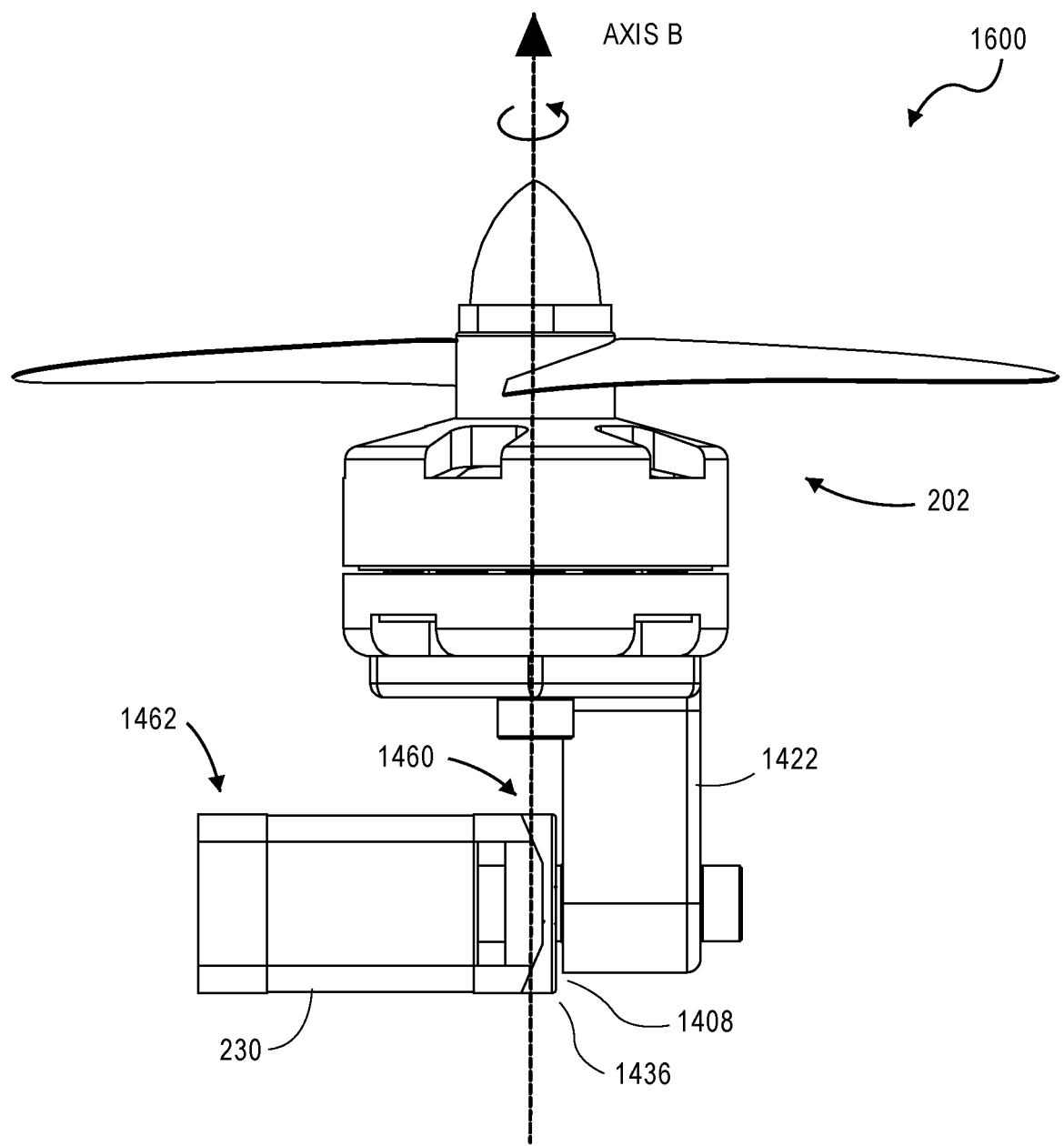
FIG. 16 illustrates a side view of the gimbaled thruster of FIGS. 13A, 13B, and 14 in accordance with aspects of the present disclosure.

FIG. 16 illustrates a side view of the gimbaled thruster of FIGS. 13 and 14 in accordance with aspects of the present disclosure. The axis of the thrust line, represented by axis B, may be located near or at center and in close proximity to the joint of the output shaft 1438 and the receptacle inner wall 1408, so as to minimize extraneous torques carried across the joint. The location of the axis of thrust may be directly impacted by the servo system 230 upper bearing 1460 location and a lower bearing 1462 location. Some prior art approaches generate unfavorable torque on the bearing shaft and bearings (which would decrease the lifespan of both as they wear faster) if the thrusting line was not aligned properly. In this aspect, the mounting arm 1422 may be configured such that the thrust motor assembly 202 thrust line of action, represented by Axis B, is aligned with the upper bearing 1460. This disclosure overcomes such issues with a placement of the center axis of the thrust line, represented by axis B, of the thrust motor assembly 202 to minimize extraneous torques carried across the system.

Figure 17:
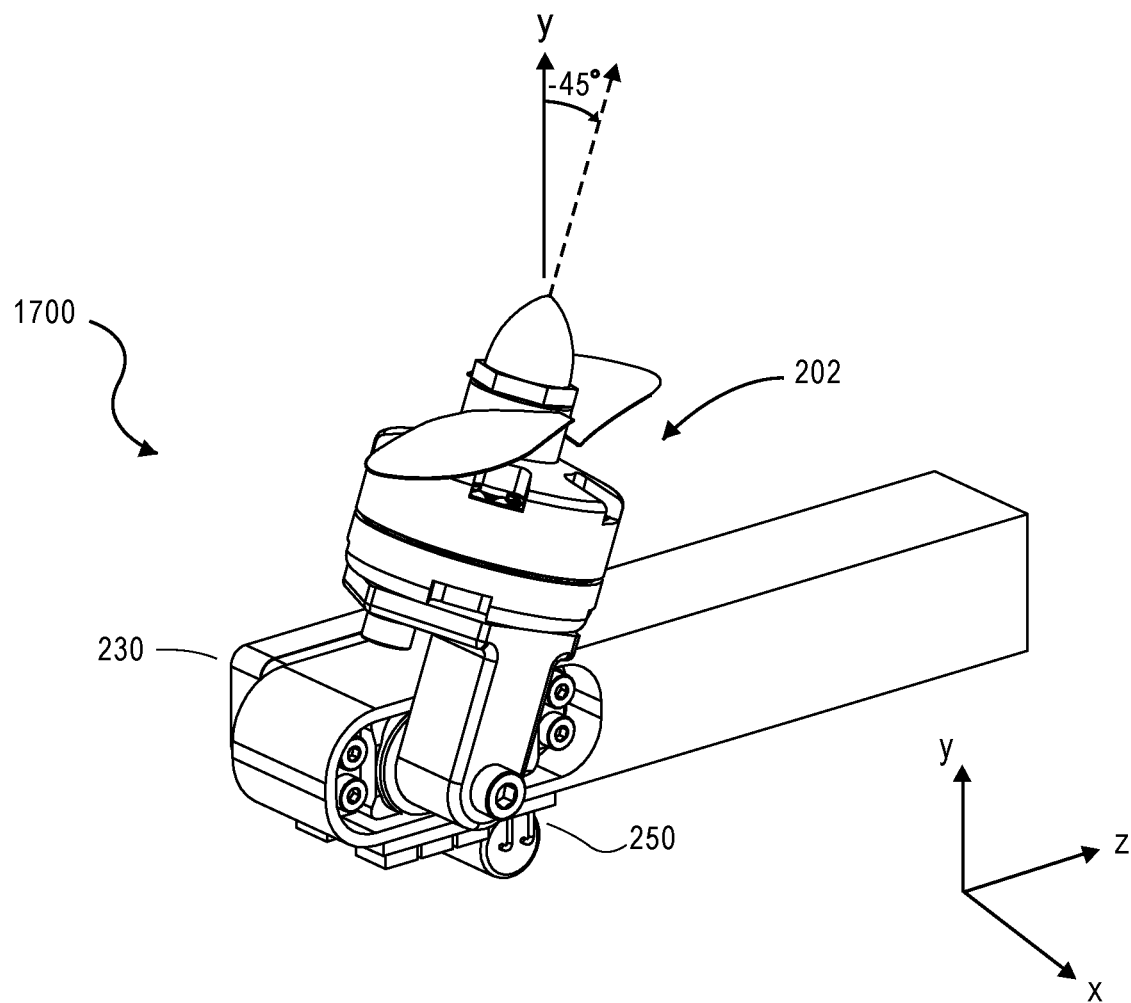
FIGS. 17, 18, and 19 illustrate various opposed titling angles about an axis line of a gimbaled thruster in accordance with aspects of the present disclosure.
Figure 18:
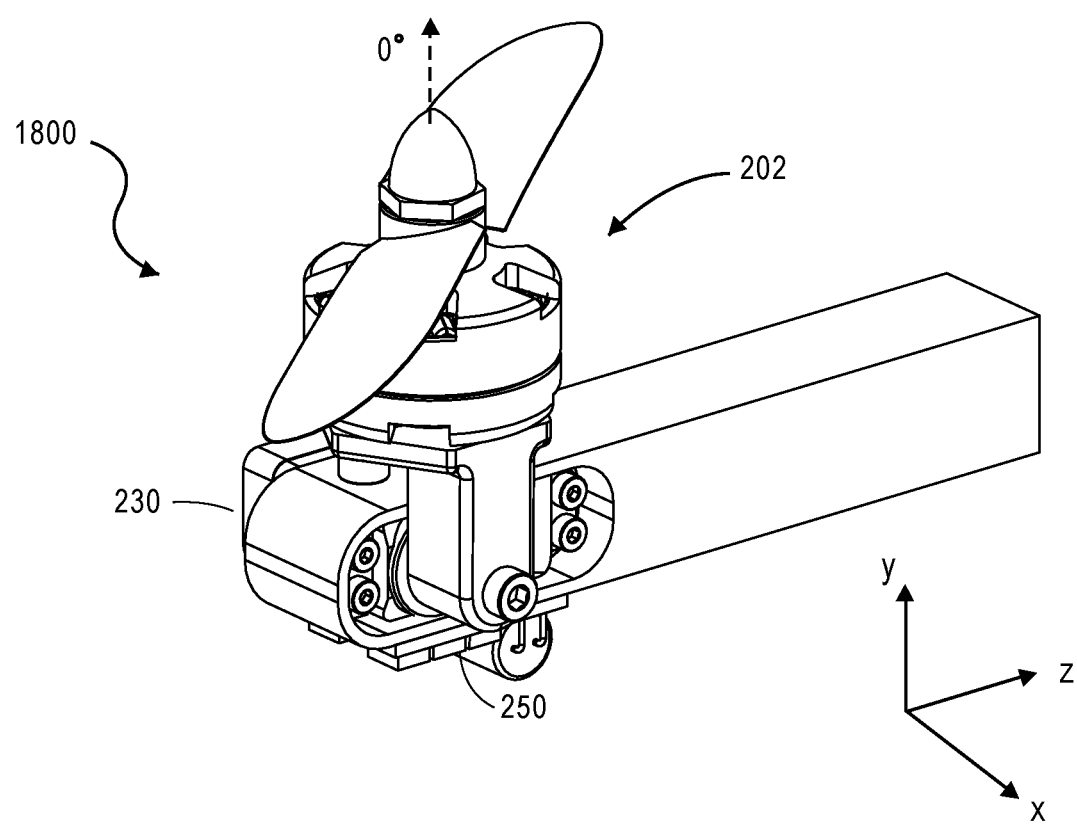
Figure 19:
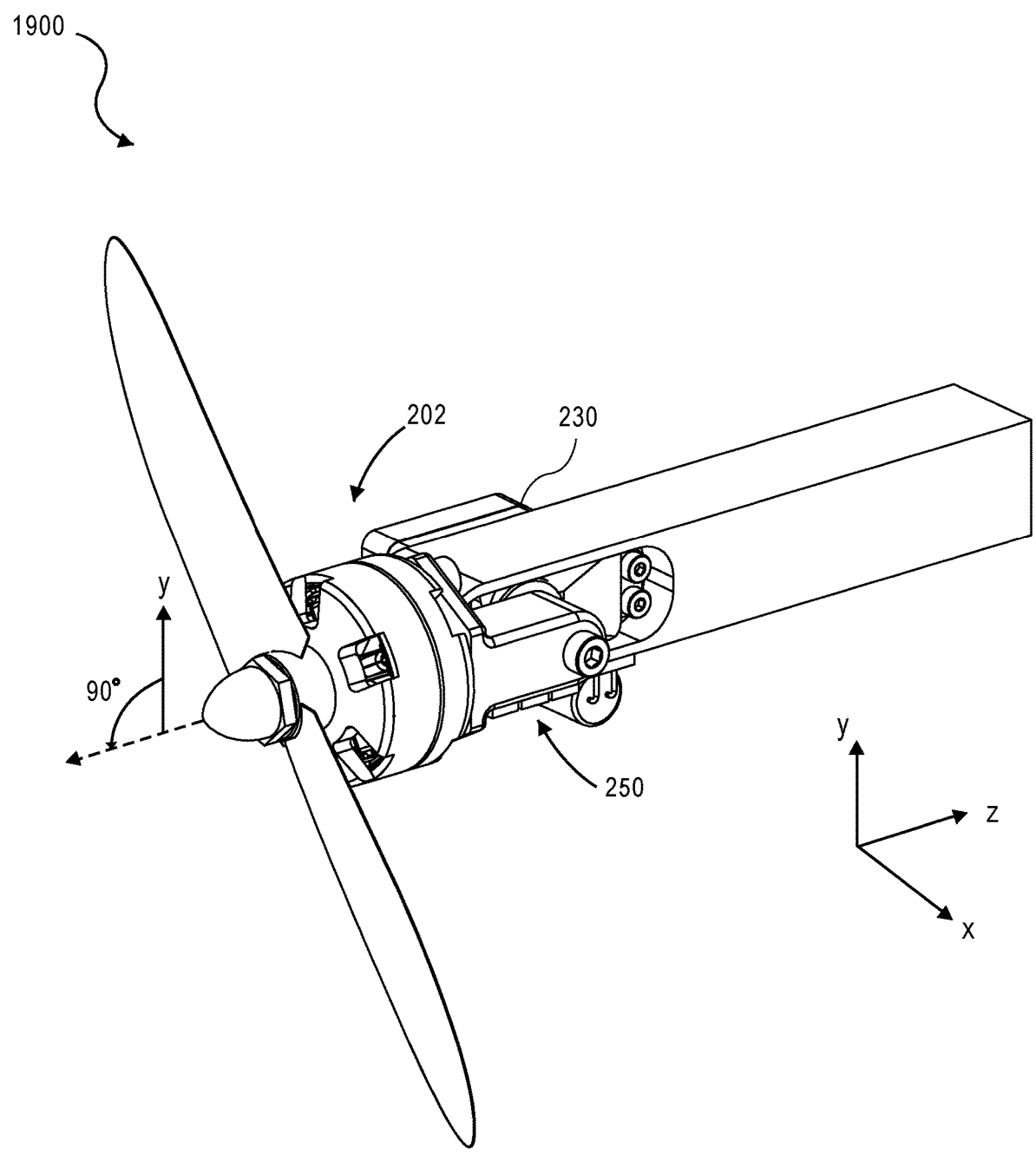

At a certain auto programmed altitude, or with pilot input, the vehicle may transition from horizontal to vertical flight mode, or vice versa. The motor can be commanded to rotate at a variable velocity that increases or decreases thrust accordingly. The autopilot control signals in the airplane may output and send a signal, for example a digital or analog signal, to the motor 209 commanding the servo system 230 to rotate through a 180 degree arc about the structure arm of the aircraft structure 240. Or the motor may be commanded to rotate at a variable velocity to increase thrust. Employing an x-y-z axis into the plane of the drawings, FIG. 17 illustrates a gimbaled thruster tilted at −45 degrees as indicated by reference numeral 1700. In this aspect, the servo can be commanded to tilt and rotate in a negative rotation arc about the structure arm of the aircraft structure 240. FIG. 18 illustrates a gimbaled thruster tilted at 0 degrees, pointing upwards as indicated by reference numeral 1800. As such, FIGS. 17 and 18 illustrate orientation before flight, i.e. during take-off and vertical lift. FIG. 19 illustrates a gimbaled thruster tilted at +90 degrees, pointed forward as indicated by reference numeral 1900. This illustrates a contemplated horizontal and forward flight mode orientation fully employing a locking mechanism discussed below. Other orientations are contemplated as well.

Figure 20:
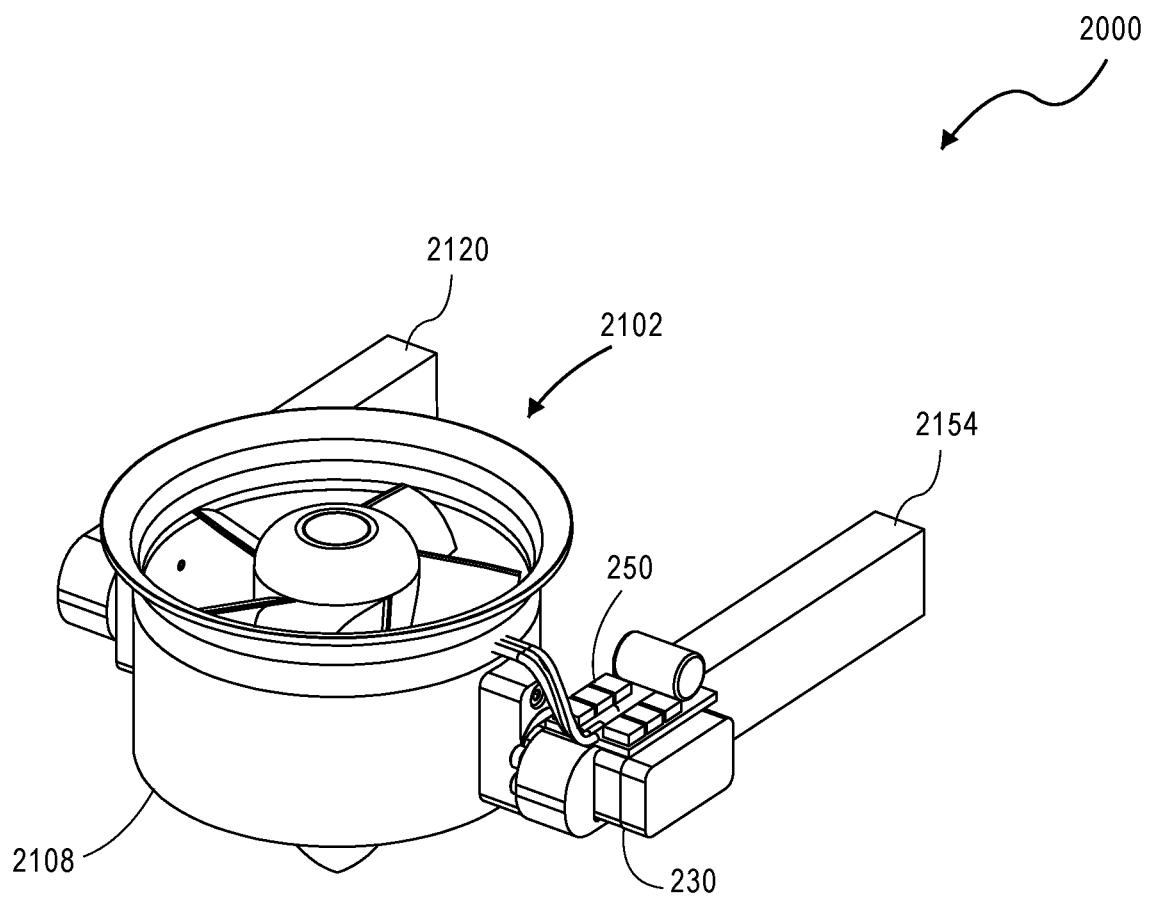
FIG. 20 illustrates a gimbaled thruster in accordance with aspects of the present disclosure.

FIG. 20 illustrates a gimbaled thruster in an operational configuration 2000 wherein a thrust motor assembly 2102 bladed component includes a high thrust and high efficiency ducted fan assembly. Such ducted fans are useful to either create a large amount of thrust with low efficiency or a low amount of thrust with high efficiency. In this aspect, the thrust motor ducted fan assembly is a high-thrust-low-efficiency assembly being connected directly or pivotally to two primary aircraft structures that provide for more rigidity and configures the aircraft in double-shear configuration. Alternatively, in another aspect with a few changes in construction, a low-thrust-high-efficiency assembly may be achieved and is contemplated by the disclosure.

The thrust motor assembly 2102 is powered and controlled by a servo system 230 and motor speed controller 250 or ESC. Further the thrust motor assembly 2102 may connect to at least two mounting assemblies, labeled as mounting assembly A and mounting assembly B, that in turn allow for both stationary and pivoting attachment to at least one primary structure arm 2120, 2154 for a novel method of flight. In this aspect, a fan assembly and adapter are directly connected to output shaft 1438 and therefore the gimbaled thruster is held or completely carried by internal servo bearings.

Figure 21:
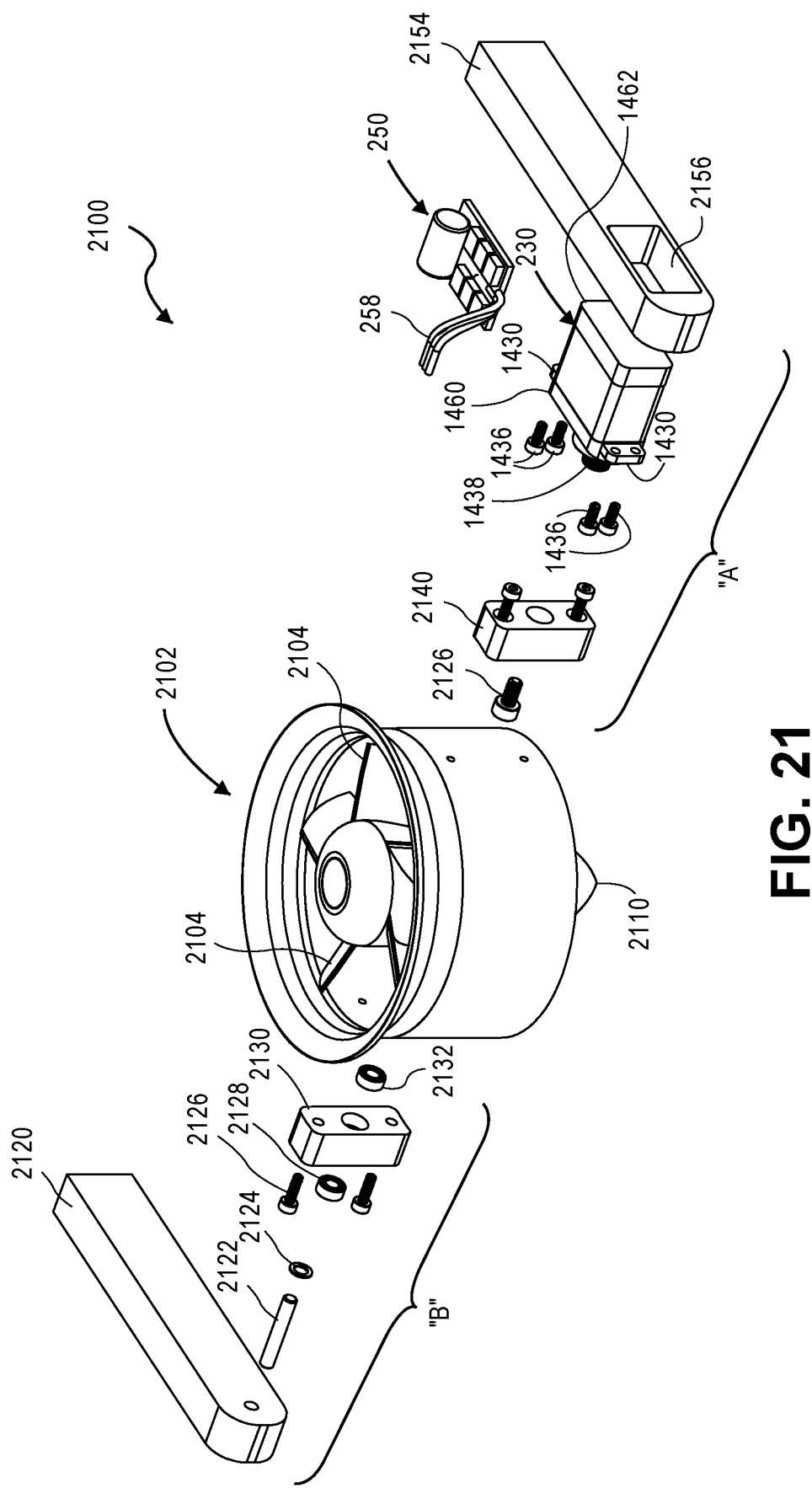
FIG. 21 illustrates an exploded view of the gimbaled thruster of FIG. 20.

FIG. 21 illustrates an exploded view 2100 of the gimbaled thruster of FIG. 20. A thrust bladed component 2104 includes a high thrust and high efficiency ducted fan assembly. Unlike the thrust motor assembly 202, this thrust assembly with a bladed fan provides high efficiency and/or high thrust to fly at greater speeds. A fan shroud 2108 houses fan blades and is configured to increase the efficiency by encapsulating the fans. The fan shroud 2108 may be configured to be integrated with mounting assemblies, such as the illustrated mounting assembly A and mounting assembly B.

Mounting assembly A may be configured to integrate the fan shroud 2108 with both the tilting components of the servo system 230 and a primary structure arm 2154 with servo mounting receptacle 2156. The mounting assembly A may use a direct and non-pivoting construction. A tail cone 2110 may extend rearward from the base of an empennage extending upward from the ducted fan. For a direct and non-pivoting connection, the fan shroud 2108 may couple with a ducted fan servo adapter 2140. The ducted fan servo adapter 2140 may act as the connection between the fan shroud 2108 and servo system 230. The ducted fan servo adapter 2140 may include a connection means, for example at least one bored hole to accept a fastener or mounting bolt 2126 to mount with the fan shroud 2108. Alternatively, in an aspect, a connecting shaft or rod may be utilized as a connection between the fan shroud 2108, the ducted fan servo adapter 2140 and the servo so as to further allow those components to pivotally couple and rotate. In yet another aspect, the fan shroud 2108 may couple with a radial load bearing on the shaft to carry the load of the thrust motor assembly 2102. These and other aspects may utilize the internal bearings of the servo system 230 instead of adding extra bearings.

In one aspect, the primary structure arm 2154 connected with mounting assembly A may be configured as a type of faring capable of housing a mounting receptacle 2156 Such components may be the servo system 230, the motor speed controller 250, and/or other components of the system. In another aspect, it is contemplated that the servo system 230 or the motor speed controller 250 may not both be housed on the inner portion of the servo mounting receptacle 2156. The body of the primary aircraft structure 1254 may have a rounded forward end for use in forward flight.

In an aspect, the ESC or the motor speed controller 250 may be mounted to a stationary side of the servo system 230 via a previously discussed adhesive 242. Alternatively, the ESC or the motor speed controller 250 may be mounted on the underside of the primary structure arm 2154 by an adhesive layer capable of absorbing heat and/or conducting heat.

The ESC or the motor speed controller 250 may be configured for, among other things, powering and communicating with the servo system 230 as described above. In this aspect, the associated cable system or the wire assembly connection 258 that attaches with a stationary implementation and/or configuration of the servo system 230 may not need as many individual wires as opposed to when the servo system 230 is capable of the gimbaled rotation discussed in another aspect.

Continuing to reference FIGS. 20 and 21, the mounting assembly B may integrate the fan shroud 2108 with a second primary structure arm 2120 through a pivot shaft adapter 2130 and a tilt shaft 2122 in order to carry a cross-plane torque. The fan shroud 2108 may fasten with a pivot shaft adapter 2130. The pivot shaft adapter 2130 may include a connection, for example at least one bored hole, to accept mounting bolts 2126, a tilt shaft 2122 and side thrust washer 2124, and/or other type fastener. This connecting shaft or rod may be configured to allow the mounting assembly B components to pivotally couple and rotate while carrying the cross-plane torque. The two bearings 2128 and 2132, or alternatively a needle bearing, brass bushing, roller bearings and/or the like, may be utilized to carry a cross-plane torque. In another aspect, the fan shroud 2108 may couple with a radial load bearing on the tilt shaft 2122 to carry the load of the thruster.

In another contemplated aspect, multiple propellers or blade components can be strung together in parallel with such mounting assemblies A, B, . . . and N.

Figure 22:
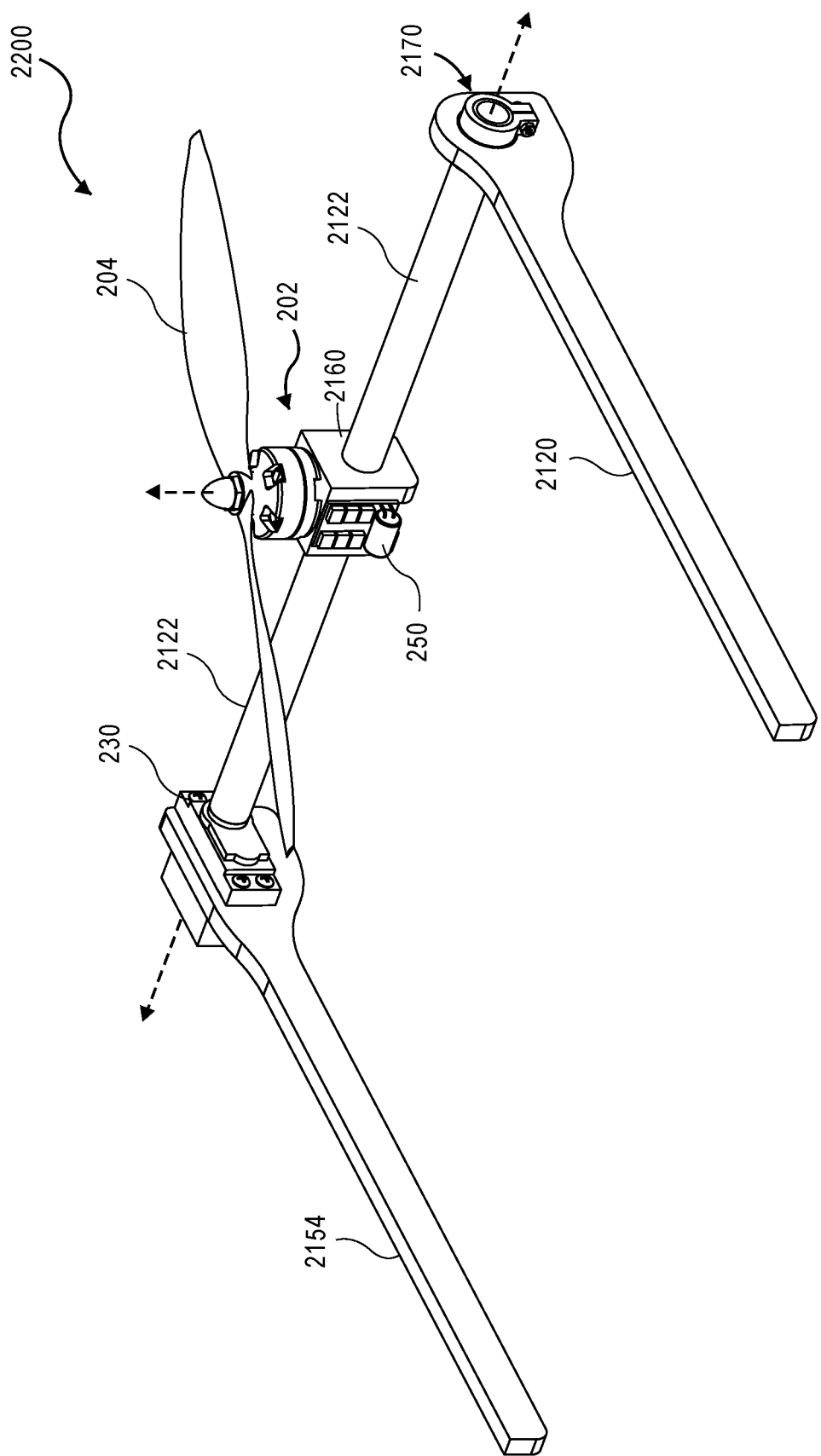
FIG. 22 illustrates an aspect of a gimbaled thruster with a tilt shaft implementation connecting two primary structural arms in accordance with similar aspects of FIGS. 20 and 21.
Figure 23:
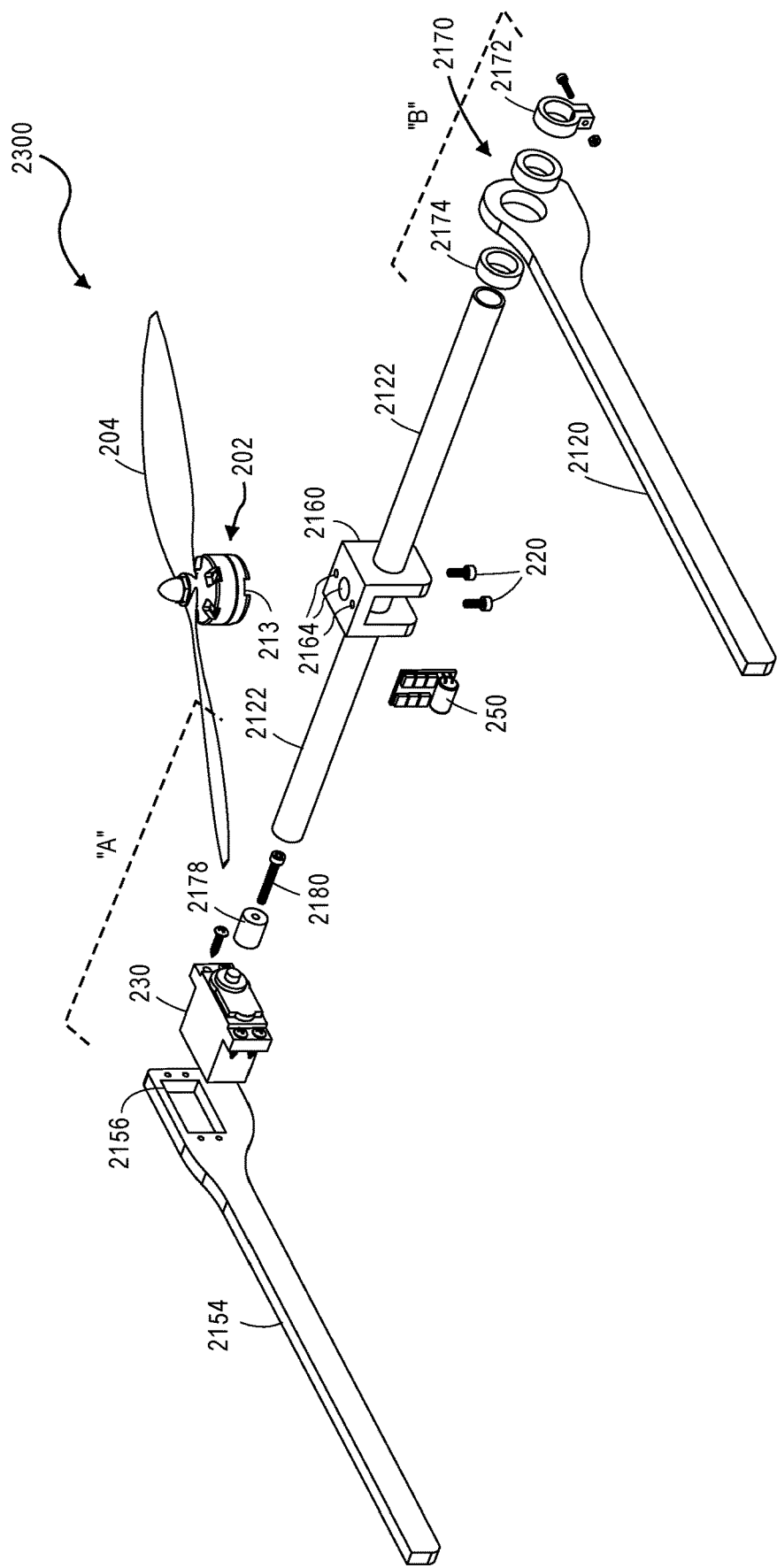
FIG. 23 illustrates an exploded view of the tilt locking mechanism of FIG. 22.

FIG. 22 illustrates an aspect of a gimbaled thruster with a tilt shaft implementation connecting two primary structural arms in accordance with similar aspects of FIGS. 20 and 21. FIG. 23 illustrates an exploded view 2300 of the gimbaled thruster of FIG. 22. The connecting tilt shaft 2122 or rod may be utilized as a connection between a tilting thrust motor assembly 202 and a stationary implementation and/or configuration of the servo system 230 so as to further allow those components to pivotally couple and rotate. Further, the tilt shaft 2122 may be sized to provide clearance between at least one propeller blade 204 on the tilting thrust motor assembly 202 and two primary structure arms 2154, 2120.

Referring to FIG. 23, the thrust motor assembly 202 and motor speed controller 250 may mount directly to a central mounting block 2160. The motor mounting block 2160 may be configured with at least one mating hole 2164, for contemplated use to accept and stabilize a motor shaft 213 of the thrust motor assembly 202. In one aspect, the motor speed controller 250 mounts directly onto the mounting block 2160. The mounting block 2160 is configured to couple with the tilt shaft 2122 via at least one mating hole 2164. The tilt shaft 2122 may connect to at least two mounting assemblies, labeled as mounting assembly A and mounting assembly B, on opposed ends of the tilt shaft 2122 that in turn allow for both stationary and pivoting attachment to the at least one primary structure arm 2120, 2154.

In one aspect of mounting assembly A, the primary structure arm 2154 may be configured as a type of faring housing a mounting receptacle 2156. The mounting receptacle in turn shields non-aerodynamic components during take-off and landing inside. This mounting receptacle 2156 construction is the same described previously in FIGS. 20 and 21. For example, such a component housed in the mounting receptacle 2156 may be the stationary implementation and/or configuration of the servo system 230, fastened to the primary structure arm 2154 by means of a fastener such as bolt. The output shaft 1438 of the servo system 230 may utilize an adapter 2178 to rigidly attach to the aft end of the tilt shaft 2122.

In one aspect of mounting assembly B, an aft end of the tilt shaft 2122 may couple with a second primary structure arm 2120 through a fastening means 2170 acting to prevent the tilt shaft 2122 from lateral displacement. The fastening means may include a ring 2174 that press-fits, glues, and/or otherwise fastens to the tilt shaft 2122 and clamp 2172 that fits snugly around an aft end of the tilt shaft 2122. The clamp 2172 and ring 2174 assembly further may prevent the tilt shaft 2122 from sliding out of a bearing 2174 as the bearing 2174 supports the rotation of the tilt shaft 2122.

Figure 24:
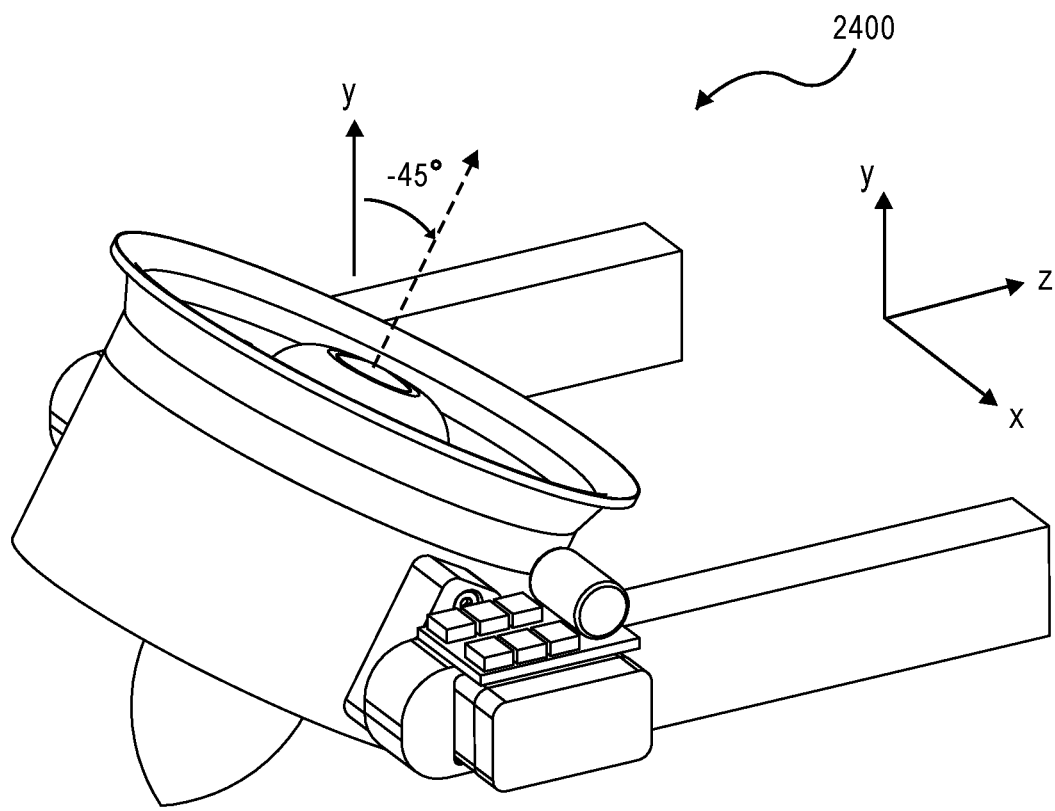
FIGS. 24, 25, and 26 illustrate various opposed titling angles about an axis line of the gimbaled thruster of FIG. 20 in accordance with aspects of the present disclosure.
Figure 25:
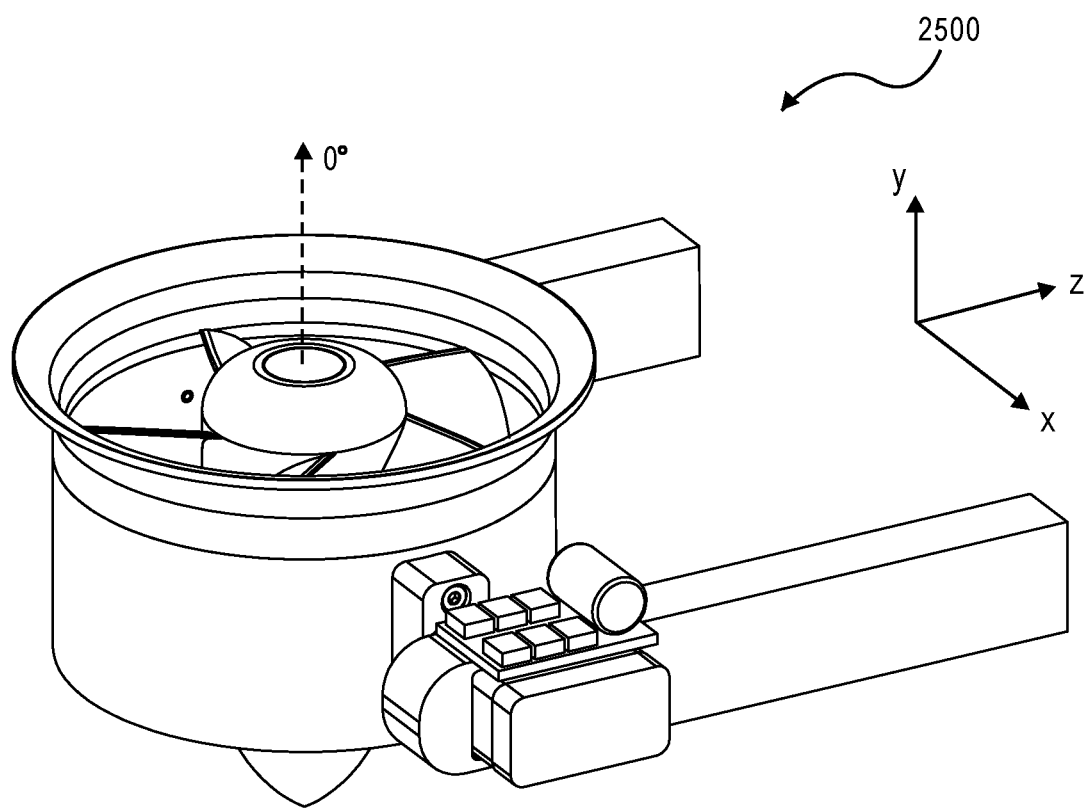
Figure 26:
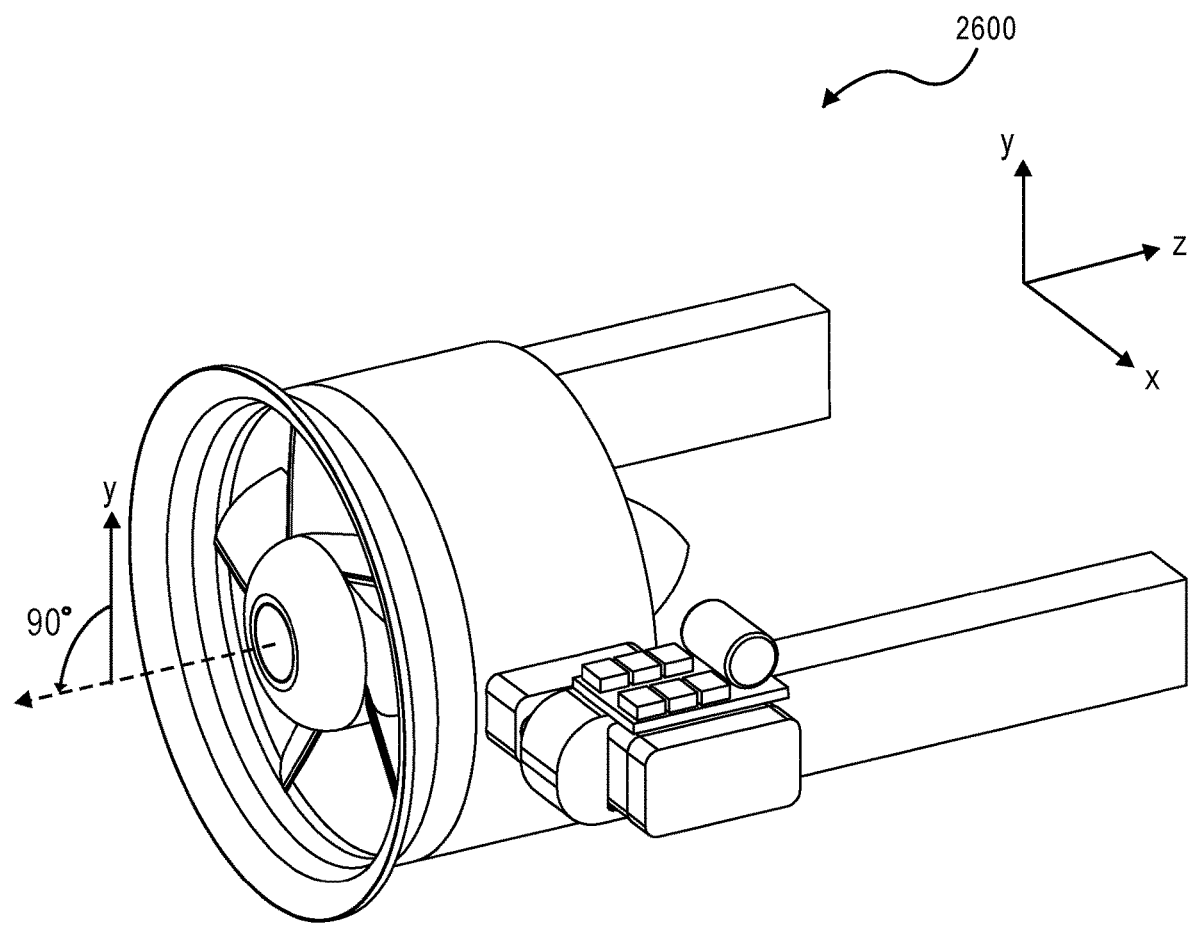
Figure 27:
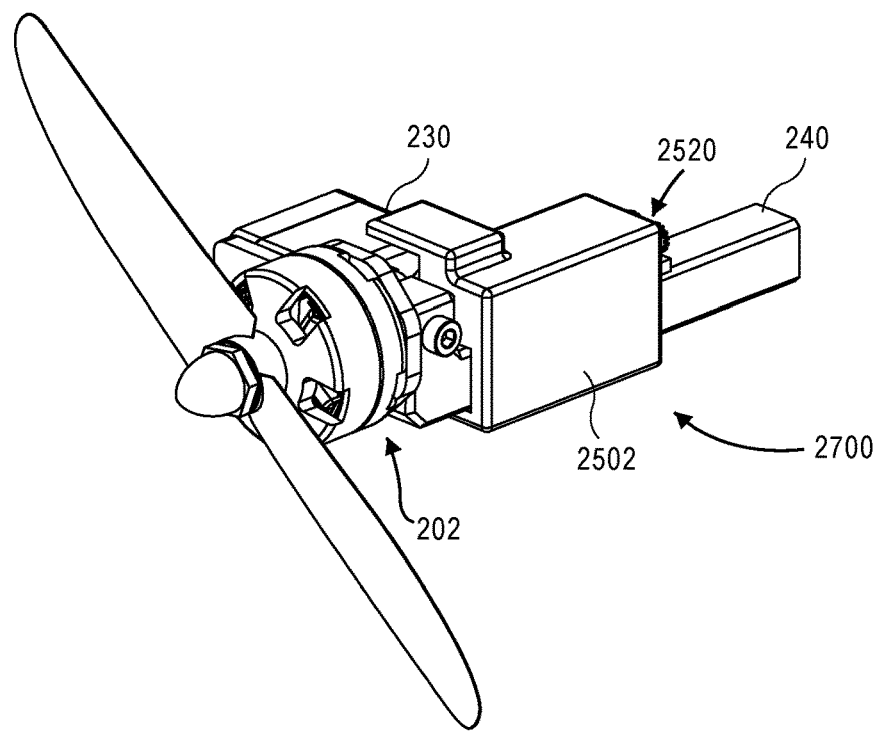
FIG. 27 illustrates a tilt locking mechanism in a locked position for use with a gimbaled thruster in accordance with aspects of the present disclosure.
Figure 28:
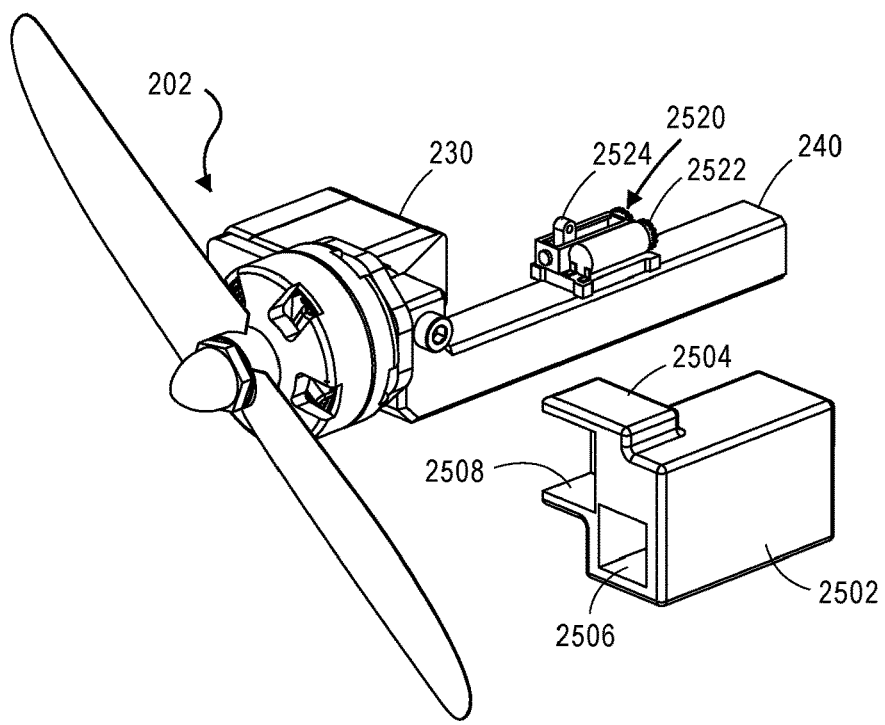
FIG. 28 illustrates an exploded view of the tilt locking mechanism of FIG. 27.
Figure 29:
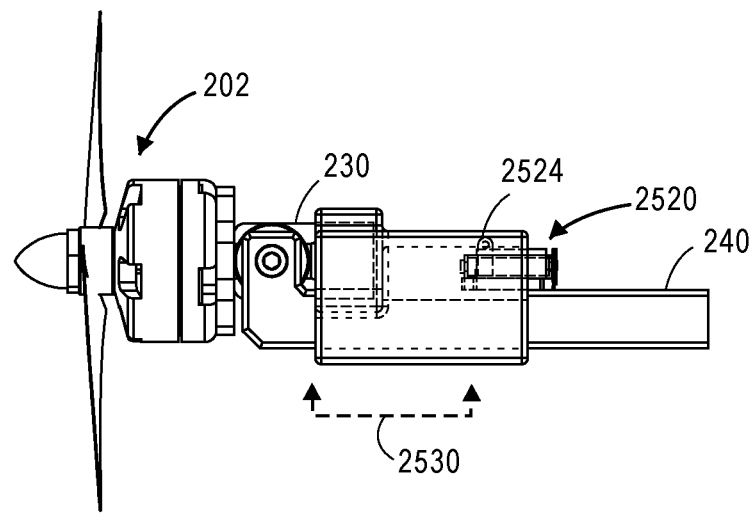
FIGS. 29 and 30 illustrate side-views of the internal components and details of the tilt locking mechanism in accordance with aspects of the present disclosure.
Figure 30:
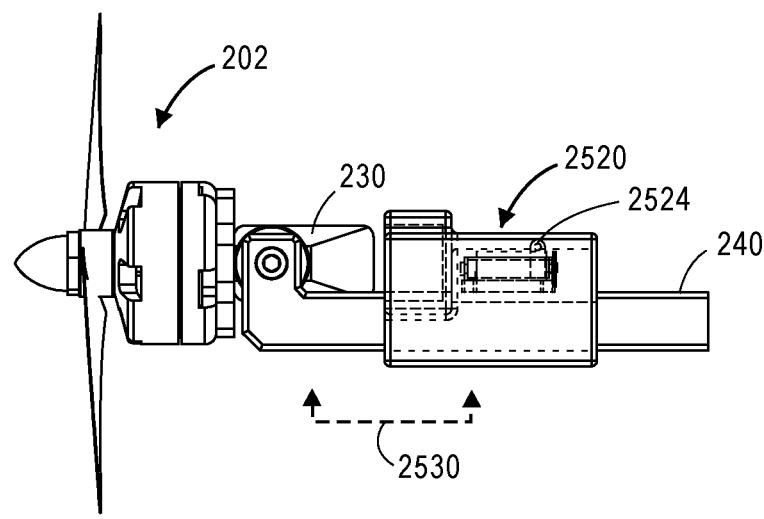

FIGS. 24, 25, and 26 illustrate opposed titling about an axis line of the gimbaled thruster of FIG. 20 in accordance with aspects of the present disclosure. Connecting the servo system 230 directly to the thrust motor assembly 2102 may afford a desired optimal range of motion in various contemplated flight modes. At a certain auto programmed altitude, or with pilot input, the vehicle may transition from the horizontal flight mode to the vertical flight mode, or vice versa. The motor of the thrust motor assembly 2102 can be commanded to rotate at a variable velocity that increases or decreases thrust accordingly. The autopilot control signals in the airplane may output and send a signal, for example a digital or analog signal, to the servo motor commanding the servo system 230 to rotate through a 180 degree arc about the primary structure arms 2120, 2154. Or the motor may be commanded to rotate at a variable velocity to increase thrust.

Employing an x-y-z axis into the plane of the drawings, FIGS. 24 and 25 illustrate a gimbaled thruster tilted at −45 degrees and 0 degrees pointing upward, respectively. As such, FIGS. 24 and 25 illustrate orientation before flight, i.e. during take-off and vertical lift. FIG. 26 illustrates a gimbaled thruster tilted at +90 degrees, pointed forward as indicated by reference numeral 2600. This illustrates a contemplated horizontal and forward flight mode orientation other orientations are contemplated as well.

Referencing FIGS. 1-39, it is contemplated in one aspect (not pictured) that there are a plurality of thrust motor assemblies 202 all capable of rotation and opposed tilting about an axis line of the gimbaled thruster. In another aspect (not pictured), it is contemplated there be one or more thrust motor assemblies 202 capable of rotating and opposed tilting, and one or more stationary thrust motor assemblies 202 not capable of rotation and opposed titling. In another aspect (not pictured), it is contemplated there be two thrust motor assemblies 202 capable of rotating and opposed tilting, and one stationary thrust motor assembly 202 not capable of rotation and opposed titling. One benefit of this configuration is during transition to flight mode, it may be easier to implement and maintain the tail motor stable during the transition. Another benefit of one stationary thrust motor assembly 202 is fewer moving parts and/or fewer numbers of propellers 204. In yet another aspect (not pictured), it is contemplated there be one thrust motor assemblies 202 capable of rotating and opposed tilting, and two stationary thrust motor assembly 202 not capable of rotation and opposed tilting.

FIGS. 27, 28, 29 and 30 illustrate a tilt locking mechanism in accordance with aspects of the present disclosure and configured to slidably couple with the above referenced structure arm of FIGS. 1-39. The contemplated tilt locking mechanism 2500 structure may be configured to, and supported by, any previously discussed primary aircraft structure such as the aircraft structure arm 240. The tilt-locking mechanism 2700 may be further configured to both prevent gimbaling during flight and reduce stress on one or more of the following components: the servo system 230, thrust motor assembly 202, adapter plate (not pictured), and/or any other components.

In one aspect, the tilt-locking mechanism 2700 may include a receptacle 2506 configured to allow a latching block 2502 to slide along a sliding path 2530 on the arm of the aircraft structure 240 between a locked position and unlocked position. This is what is referenced, but not limited by, in the above paragraph as "slidably couple." For example, in an aspect, a latching block 2502 may slide in a linear forward and backward motion along a predetermined sliding path 2530 between a first "locked" position and a second "unlocked" position.

The tilt-locking mechanism 2700 may move from a locked to unlocked position along the arm of the aircraft structure 240 by an electro-mechanical device. In one aspect, a linear servo 2520 may mount on the arm of the aircraft structure 240 so to pull and retract, thus controlling the forward and backward movement of the latching block 2502. The linear servo may include a motor and gears 2522 that further function to activate and release a control horn 2524. As the servo pulls the block to one position or the next, the horn 2524 locks with or releases movement of a latching block 2502. To detect a position of the horn 2524, such as how far the horn 2524 has slid, a circuit board may run a control loop that includes a sensor, such as linear resister, for such detection.

In order to constrain certain components on the tilting part of the vehicle from translating during flight, the latching block 2502 may include at least one latching block arm 2504. The at least one latching block arm 2504 may further be configured to form a latching interface 2508 with one or more of the following components: the servo system 230, thrust motor assembly 202, and adapter plate (not pictured). The latching block 2502 first position constrains or locks in place one or more of the following components: the servo system 230, thrust motor assembly 202, and adapter plate (not pictured). The latching block second position allows the named components to freely rotate, tilt, or gimbal.

Figure 31:
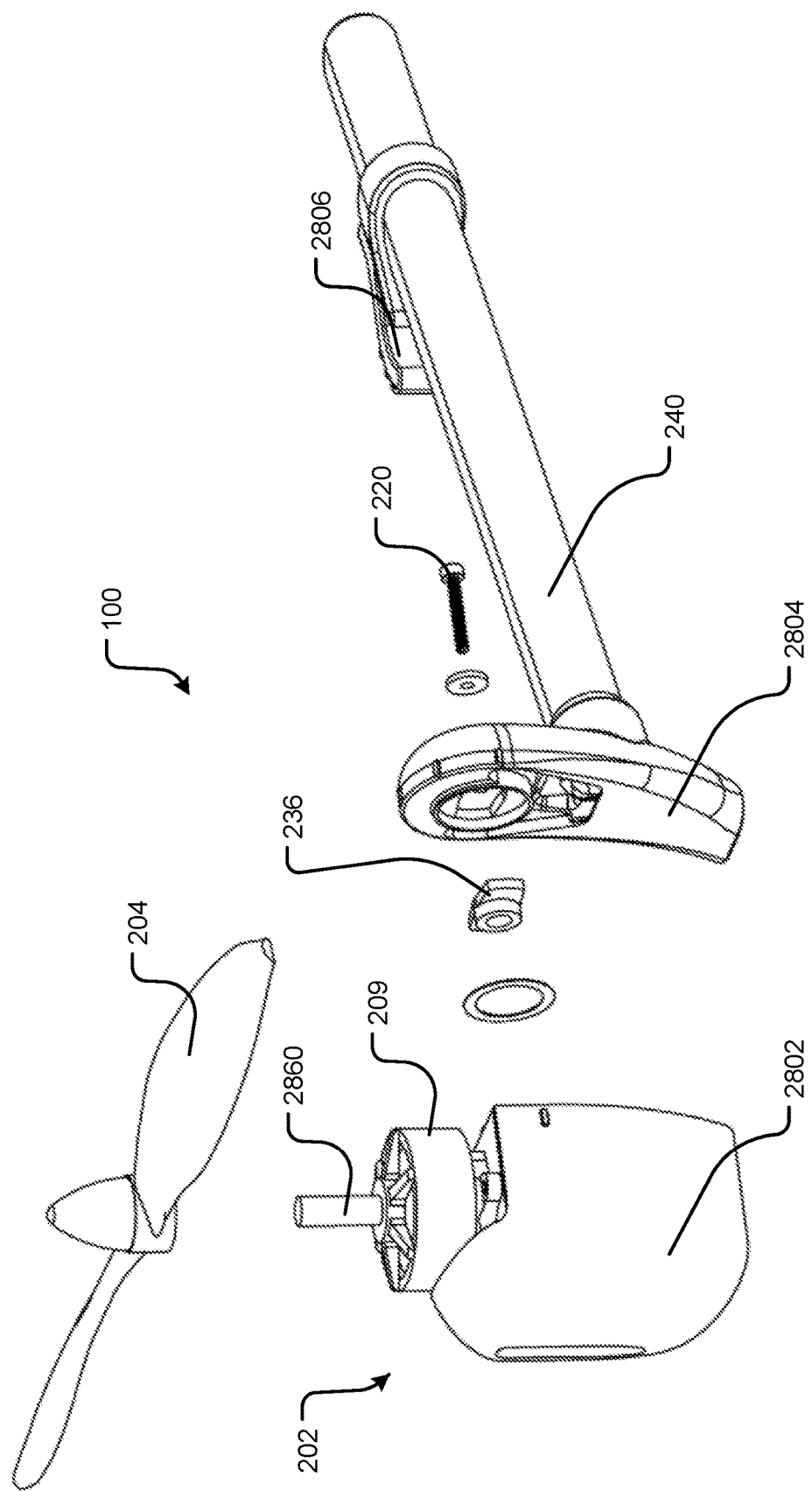
FIG. 31 illustrates an exploded view of a gimbaled thruster in accordance with aspects of the present disclosure.
Figure 32:
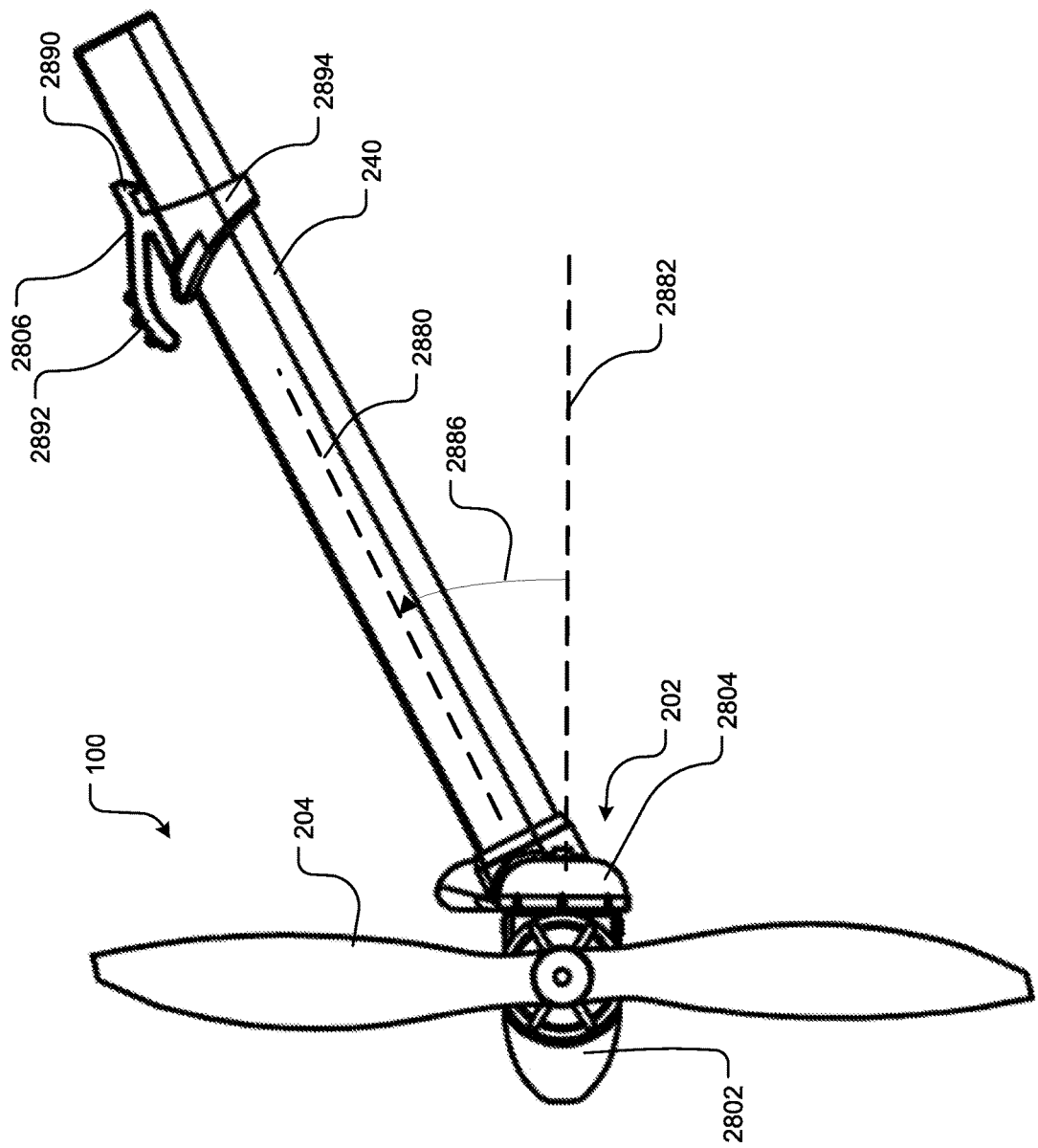
FIG. 32 illustrates a top view of a gimbaled thruster according to FIG. 31.
Figure 33:
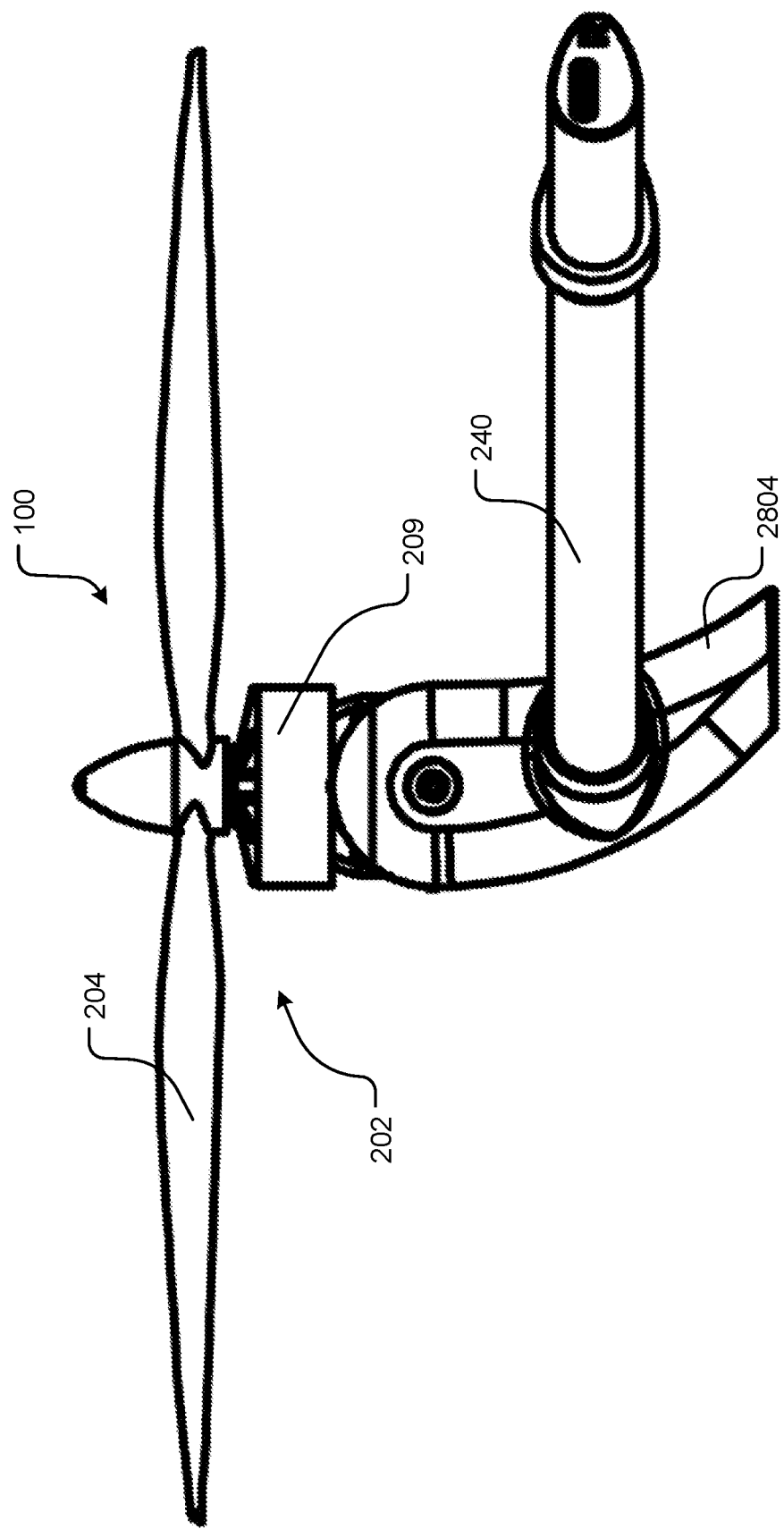
FIG. 33 illustrates a side view of a gimbaled thruster according to FIG. 31.
Figure 34:
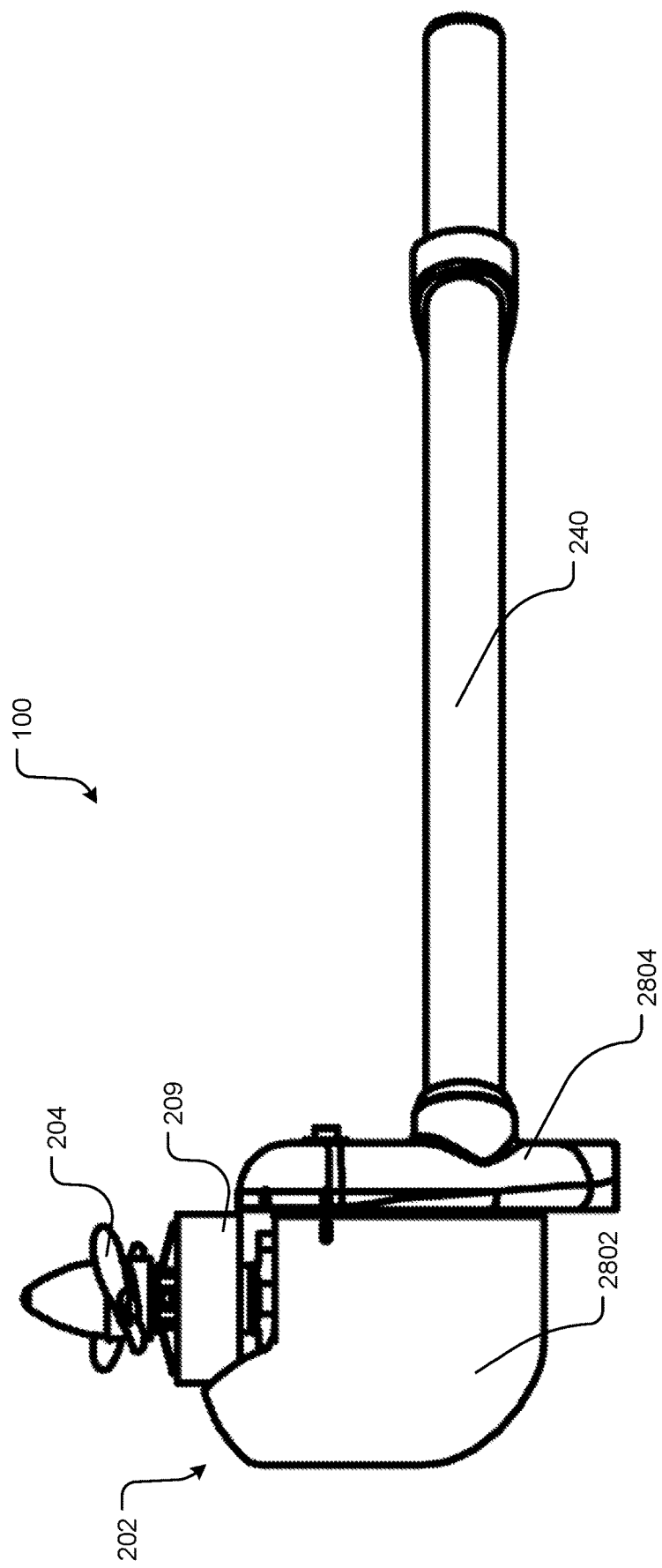
FIG. 34 illustrates a side view of a gimbaled thruster according to FIG. 31.
Figure 35:
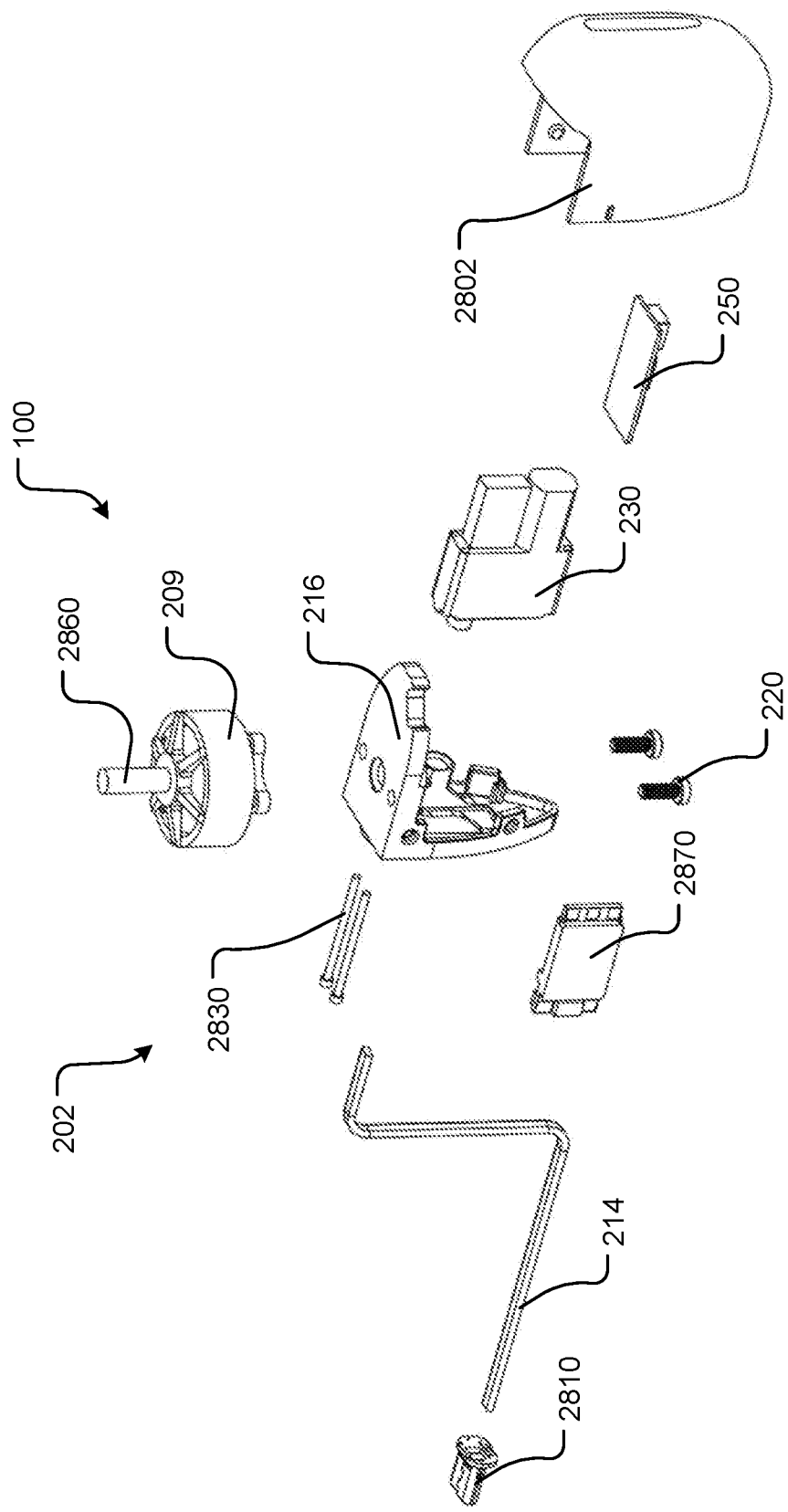
FIG. 35 illustrates a partial exploded view of a gimbaled thruster according to FIG. 31.
Figure 36:
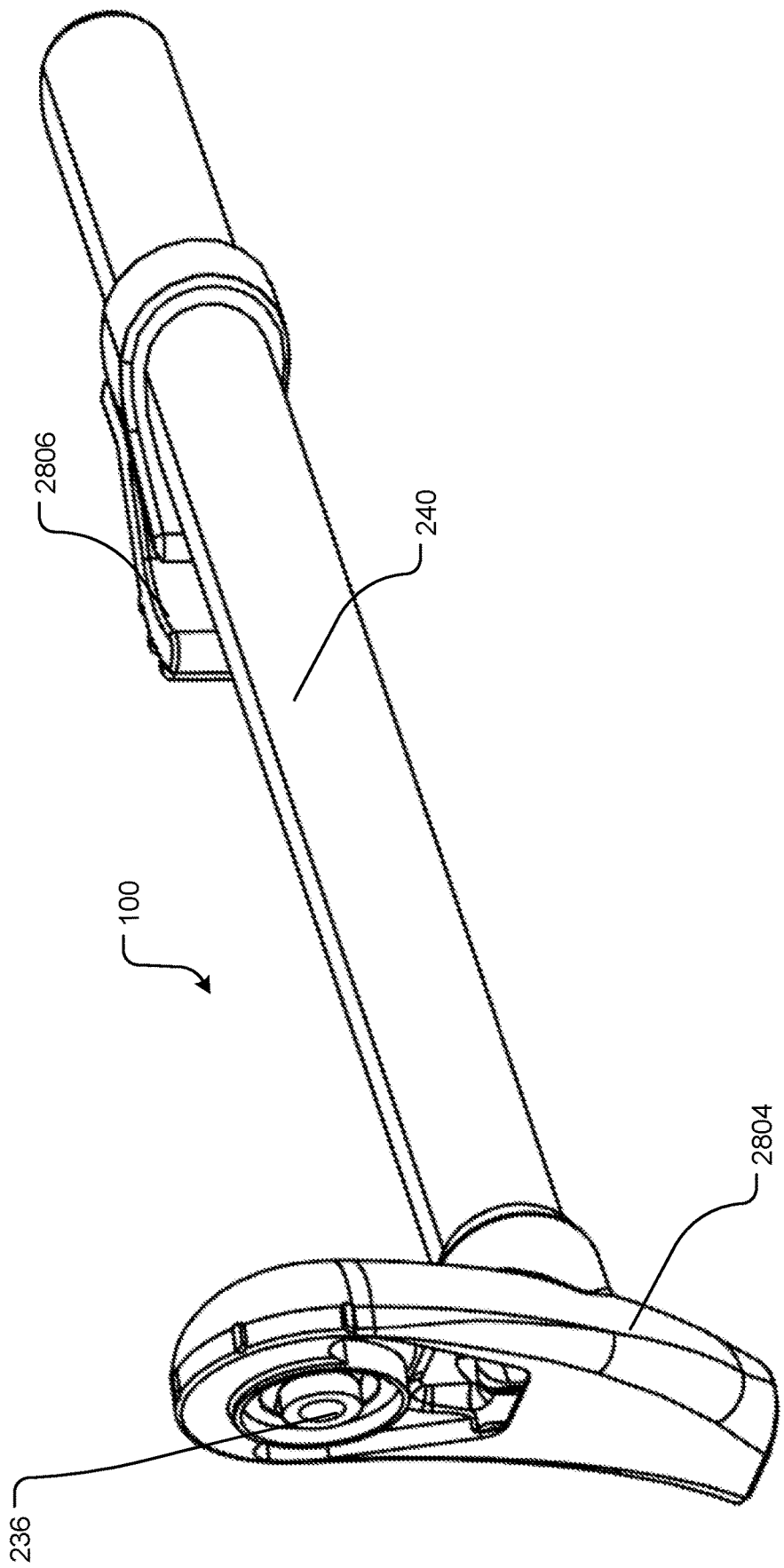
FIG. 36 illustrates a partial perspective view of structure supporting the gimbaled thruster according to FIG. 31.
Figure 37:
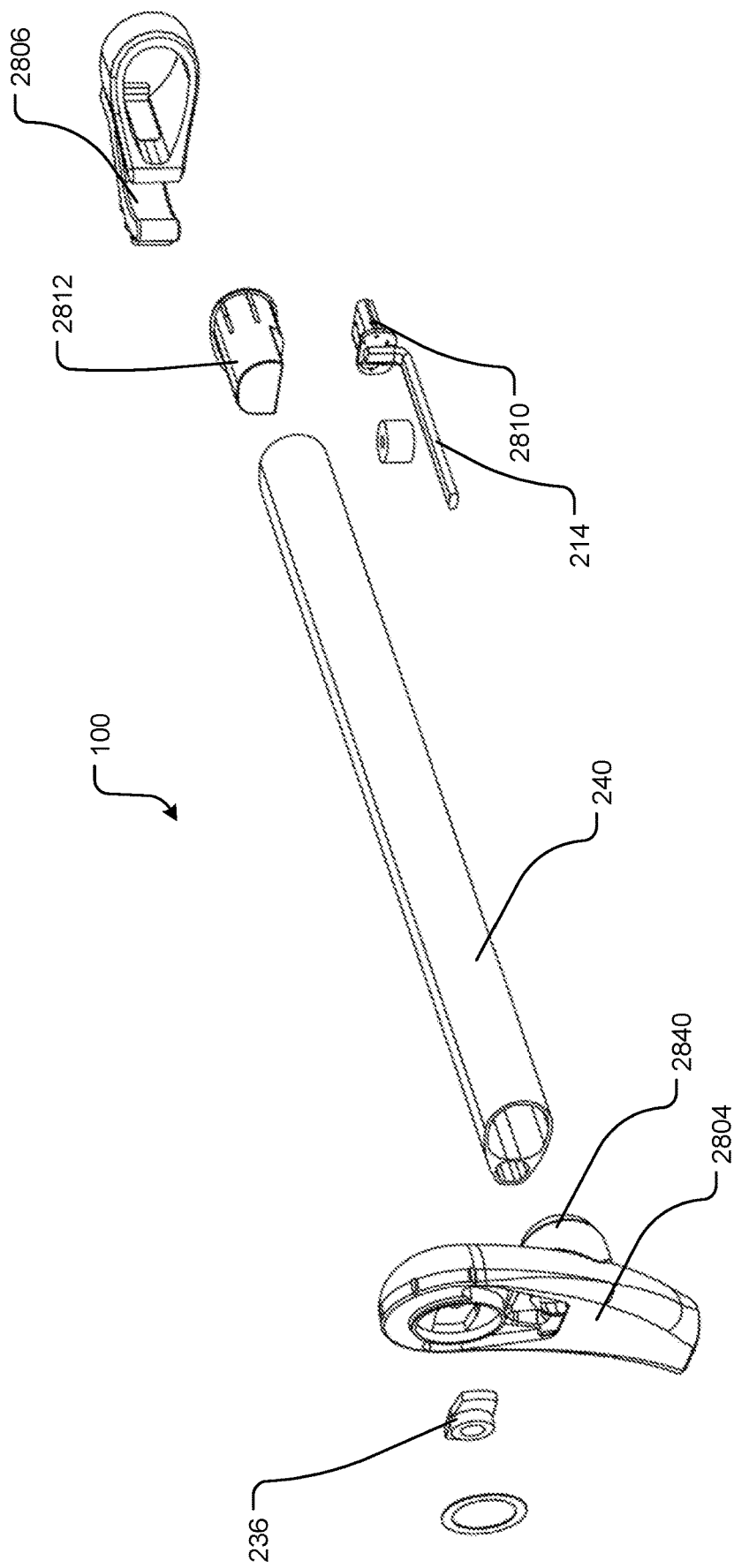
FIG. 37 illustrates a partial exploded view of the structure gimbaled thruster according to FIG. 36.

FIG. 31 illustrates an exploded view of a gimbaled thruster in accordance with aspects of the present disclosure; FIG. 32 illustrates a top view of a gimbaled thruster according to FIG. 31; FIG. 33 illustrates a side view of a gimbaled thruster according to FIG. 31; FIG. 34 illustrates a side view of a gimbaled thruster according to FIG. 31; FIG. 35 illustrates a partial exploded view of a gimbaled thruster according to FIG. 31; FIG. 36 illustrates a partial perspective view of structure supporting the gimbaled thruster according to FIG. 31; and FIG. 37 illustrates a partial exploded view of the structure gimbaled thruster according to FIG. 36.

In particular, the aspects illustrated in FIGS. 31-37 and/or described herein may include any one or more of the various other aspects described herein. Moreover, the aspects illustrated in FIGS. 1-30 and/or described herein may include one or more of the aspects illustrated in FIGS. 31-37. As illustrated in FIGS. 31-37, the gimbaled thruster 100 that includes the thrust motor assembly 202 may be integrated into the arm of the aircraft structure 240. The arm of the aircraft structure 240 may include a connector and a latch 2806. The connector and latch 2806 may snap fit into a corresponding aircraft structure.

In one aspect illustrated in FIG. 32, the connector and latch 2806 may include a hook portion 2890 that hooks onto a corresponding portion of the aircraft structure. In this regard, inserting the arm of the aircraft structure 240 into the aircraft structure may snap the hook portion 2890 into the aircraft structure.

In one aspect, the connector and latch 2806 may include a handle portion 2892 that when squeezed moves the hook portion 2890 to an unlocked position that allows the arm of the aircraft structure 240 to be removed from the aircraft structure. In one aspect, the connector and latch 2806 may include a ring portion 2894 that is configured to receive the arm of the aircraft structure 240. The connector and latch 2806 may be formed of one or more metal materials, synthetic materials, plastic materials, reinforced plastic materials, and/or the like. In one aspect, the connector and latch 2806 may be molded, 3-D printed, machined, and/or the like. Other types of connections between the arm of the aircraft structure 240 and the aircraft structure are contemplated as well.

Additionally, as illustrated in FIGS. 31-37, the gimbaled thruster 100 that includes the thrust motor assembly 202 may include a tilt pod shroud portion 2802. The tilt pod shroud portion 2802 may form a fairing having one or more curved surfaces providing a low coefficient of drag, which reduces aerodynamic drag, reduces thrust needed to maintain a desired flight envelope, increases efficiency, range, endurance, and/or the like. The tilt pod shroud portion 2802 may partially surround the motor 209. In particular, the motor 209 may be arranged and located on an upper portion of the motor mounting adapter plate 216 and the tilt pod shroud portion 2802 may partially surround the motor 209. As further illustrated in FIG. 31, a motor shaft 2860 may extend vertically from the motor 209 for connection to the propeller 204. More specifically with reference to FIG. 35, the motor 209 may attach to the motor mounting adapter plate 216. Additionally, the tilt pod shroud portion 2802 and the servo system 230 may attach to the motor mounting adapter plate 216. Then as illustrated in FIG. 31, the thrust motor assembly 202 may attach to the tilt mount portion 2804.

The arm of the aircraft structure 240 may include a tilt mount portion 2804. The tilt mount portion 2804 may be configured to mechanically fasten the thrust motor assembly 202 to the arm of the aircraft structure 240. The tilt mount portion 2804 may be further configured to keep liquid, air, dust, and/or the like away from the internal components of the thrust motor assembly 202. The tilt mount portion 2804 may form a fairing having one or more curved surfaces providing a low coefficient of drag, which reduces aerodynamic drag, reduces thrust needed to maintain a desired flight envelope, increases efficiency, range, endurance, and/or the like. The tilt mount portion 2804 may be implemented as a thin-walled structure. The tilt mount portion 2804 may have a corresponding and complementary shape to the tilt pod shroud portion 2802. Accordingly, the tilt pod shroud portion 2802 and the tilt mount portion 2804 may form a combined fairing having one or more curved surfaces providing a low coefficient of drag, which reduces aerodynamic drag, reduces thrust needed to maintain a desired flight envelope, increases efficiency, range, endurance, and/or the like. Additionally, the tilt pod shroud portion 2802 and the tilt mount portion 2804 may cover and protect various components. For example, the tilt pod shroud portion 2802 and the tilt mount portion 2804 may cover and protect the servo system 230, the motor speed controller 250, the at least two power wires 214, the voltage regulator 2870, and/or the like.

Additionally, the tilt pod shroud portion 2802 and the tilt mount portion 2804 may be configured to be waterproof or water resistant. In this regard, the tilt pod shroud portion 2802 and the tilt mount portion 2804 may include grease, seals, sealants, and/or the like. In one aspect, the thrust motor assembly 202 may include grease in a joint between the servo system 230 and the tilt mount portion 2804. The tilt pod shroud portion 2802 and the tilt mount portion 2804 may be formed of one or more metal materials, synthetic materials, plastic materials, reinforced plastic materials, and/or the like. In one aspect, the tilt pod shroud portion 2802 and the tilt mount portion 2804 may be molded, 3-D printed, machined, and/or the like.

In one or more aspects, the tilt mount portion 2804 may support the interface adapter 236 to provide the functionality as described herein. The tilt mount portion 2804 may further include a housing portion for housing the interface adapter 236. The tilt mount portion 2804 may further include an aperture extending therethrough for receiving the at least one fastener 220, which may extend through the tilt mount portion 2804, one or more washers, the interface adapter 236, and/or the like to connect to the servo system 230 (not shown), which may be located within the tilt pod shroud portion 2802.

With reference to FIG. 35, the motor mounting adapter plate 216 may in part wrap around the servo system 230 and may support the motor 209, the tilt pod shroud portion 2802, the motor speed controller 250, the voltage regulator 2870, and/or the like. The servo system 230 may be attached to the motor mounting adapter plate 216 with fasteners 2830, such as bolts, screws, rivets, and/or the like. The motor mounting adapter plate 216 may further receive the at least two power wires 214 for connections to the servo system 230, the motor speed controller 250, the voltage regulator 2870, and/or the like. In one aspect, the voltage regulator 2870 may be configured to provide power to the servo system 230. The at least two power wires 214 may further include a connector 2810 arranged on one end. Additionally, the at least two power wires 214 may further include signal wires. The signal wires may include one to five signal wires. The connector 2810 may facilitate manufacturing, replacement, and/or repair of the gimbaled thruster 100 and/or the thrust motor assembly 202. As illustrated in FIG. 35, the motor speed controller 250 may be arranged entirely with the thrust motor assembly 202 and may move with the thrust motor assembly 202. The motor mounting adapter plate 216 may be formed of one or more metal materials, synthetic materials, plastic materials, reinforced plastic materials, and/or the like. In one aspect, the motor mounting adapter plate 216 may be molded, 3-D printed, machined, and/or the like. In one aspect, the motor mounting adapter plate 216 may be configured for assembly of the thrust motor assembly 202 without utilizing adhesive. In one aspect, the thrust motor assembly 202 may be configured and implemented without the motor mounting adapter plate 216. In this aspect, the thrust motor assembly 202 may be configured and implemented to provide the functionality provided by the motor mounting adapter plate 216.

The construction of the gimbaled thruster 100, the thrust motor assembly 202, the arm of the aircraft structure 240, and/or the like provides routing of the at least two power wires 214 therethrough for protection from dust, debris, and the like. Moreover, this construction hides the at least two power wires 214. Additionally, the voltage regulator 2870 may be implemented as an integrated board configured for cable management of the at least two power wires 214 and further configured for ease of manufacturing, assembly, and/or repair.

The construction of the gimbaled thruster 100 and the thrust motor assembly 202 illustrated in FIGS. 31-37 provides a more flexible interface to the arm of the aircraft structure 240. The arm of the aircraft structure 240 may be formed of one or more metal materials, synthetic materials, plastic materials, reinforced plastic materials, and/or the like. In one aspect, the arm of the aircraft structure 240 may be molded, extruded, 3-D printed, machined, and/or the like. In one aspect, the arm of the aircraft structure 240 may be a carbon tube. Additionally, the arm of the aircraft structure 240 may be implemented with numerous configurations such that the thrust motor assembly 202, the gimbaled thruster 100, and/or the like may be arranged at different angles. The arm of the aircraft structure 240 may also be configured with a linear construction or various angled constructions. In this regard and with reference to FIG. 32, a longitudinal axis 2880 of the arm of the aircraft structure 240 is illustrated; and an axis 2882 about which the gimbaled thruster 100 tilts is illustrated. The configuration of the gimbaled thruster 100 and the arm of the aircraft structure 240 may be such that an angle 2886 between the longitudinal axis 2880 of the arm of the aircraft structure 240 and the axis 2882 about which the gimbaled thruster 100 rotates may be 0°-180°, 0°-20°, 20°-40°, 40°-60°, 60°-80°, 80°-100°, 100°-120°, 120°-140°, 140°-160°, or 160°-180°.

The construction of the gimbaled thruster 100 and the thrust motor assembly 202 illustrated in FIGS. 31-37 further provides increased durability for the at least two power wires 214. In this regard, a minimal length of the at least two power wires 214 may be allowed to flex after it enters the motor mounting adapter plate 216, which reduces the strain and increases service life. For example, this minimal length may be 1 cm-10 cm in length, 1 cm-3 cm in length, 3 cm-6 cm in length, or 6 cm-10 cm in length.

The arm of the aircraft structure 240 may be implemented such that it is serviceable such that the arm of the aircraft structure 240 may be removed and replaced easily in conjunction with the various components of the thrust motor assembly 202. In one aspect, the arm of the aircraft structure 240 may be implemented with a replaceable component. In this regard, the arm of the aircraft structure 240 and the gimbaled thruster 100 may be configured as an arm module that together with the connector and latch 2806 and/or the connector 2810 allows quick and easy replacement of the arm module.

With reference to FIG. 37, the arm of the aircraft structure 240 may include a hollow conduit allowing the at least two power wires 214 to extend through the arm of the aircraft structure 240 for connection to the thrust motor assembly 202. The arm of the aircraft structure 240 may further include an end cap 2812 configured to be received in one end of the arm of the aircraft structure 240. The arm of the aircraft structure 240 may connect to the tilt mount portion 2804 via an attachment portion 2840. The attachment portion 2840 may include an aperture configured to receive one end of the arm of the aircraft structure 240. The attachment portion 2840 may attach to the one end of the arm of the aircraft structure 240 with an adhesive, a fastener, a snap fit connection, and/or the like.

Figure 38:
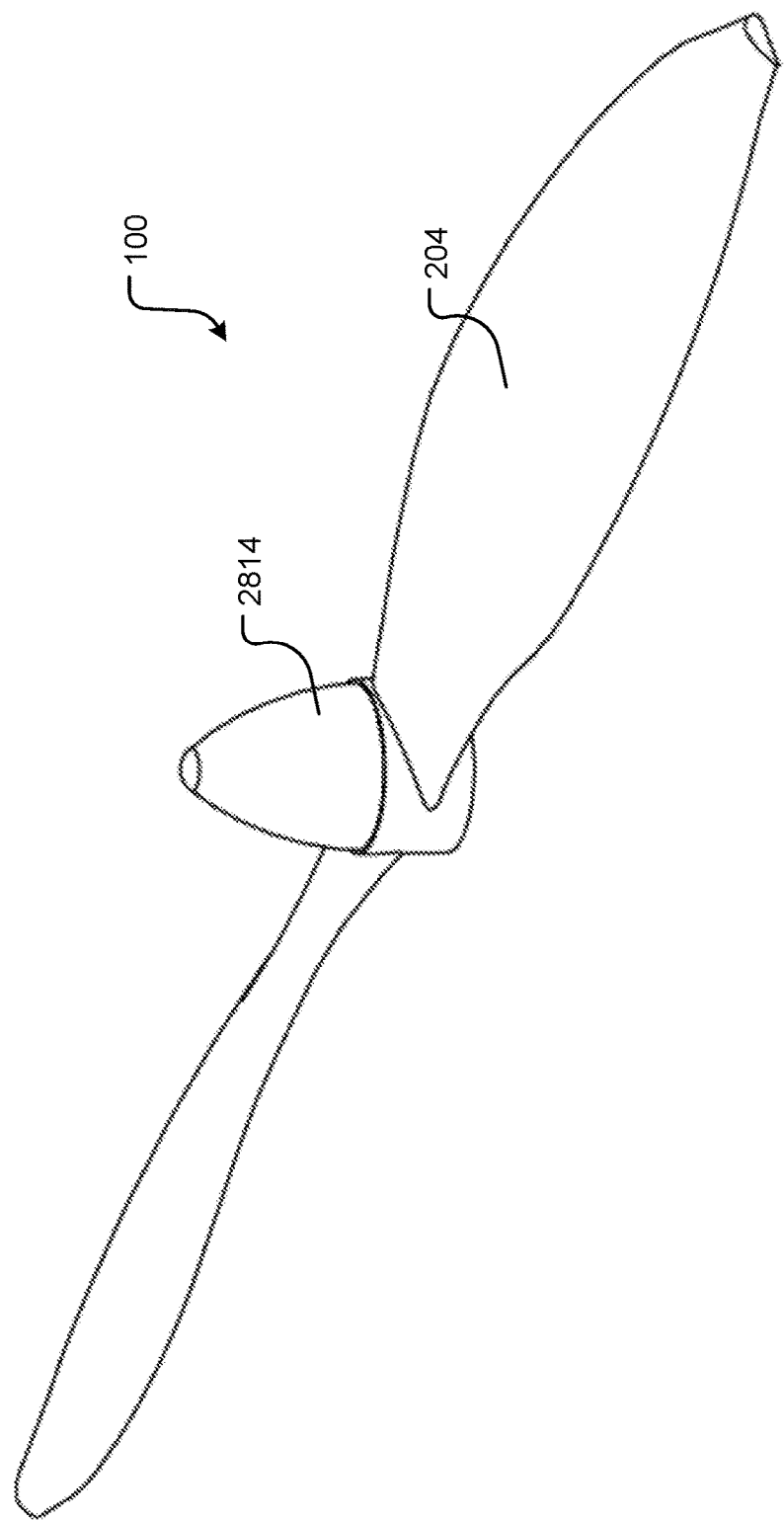
FIG. 38 illustrates a perspective view of a bladed component according to FIG. 31.

FIG. 38 illustrates a perspective view of a bladed component according to FIG. 31.

Figure 39:
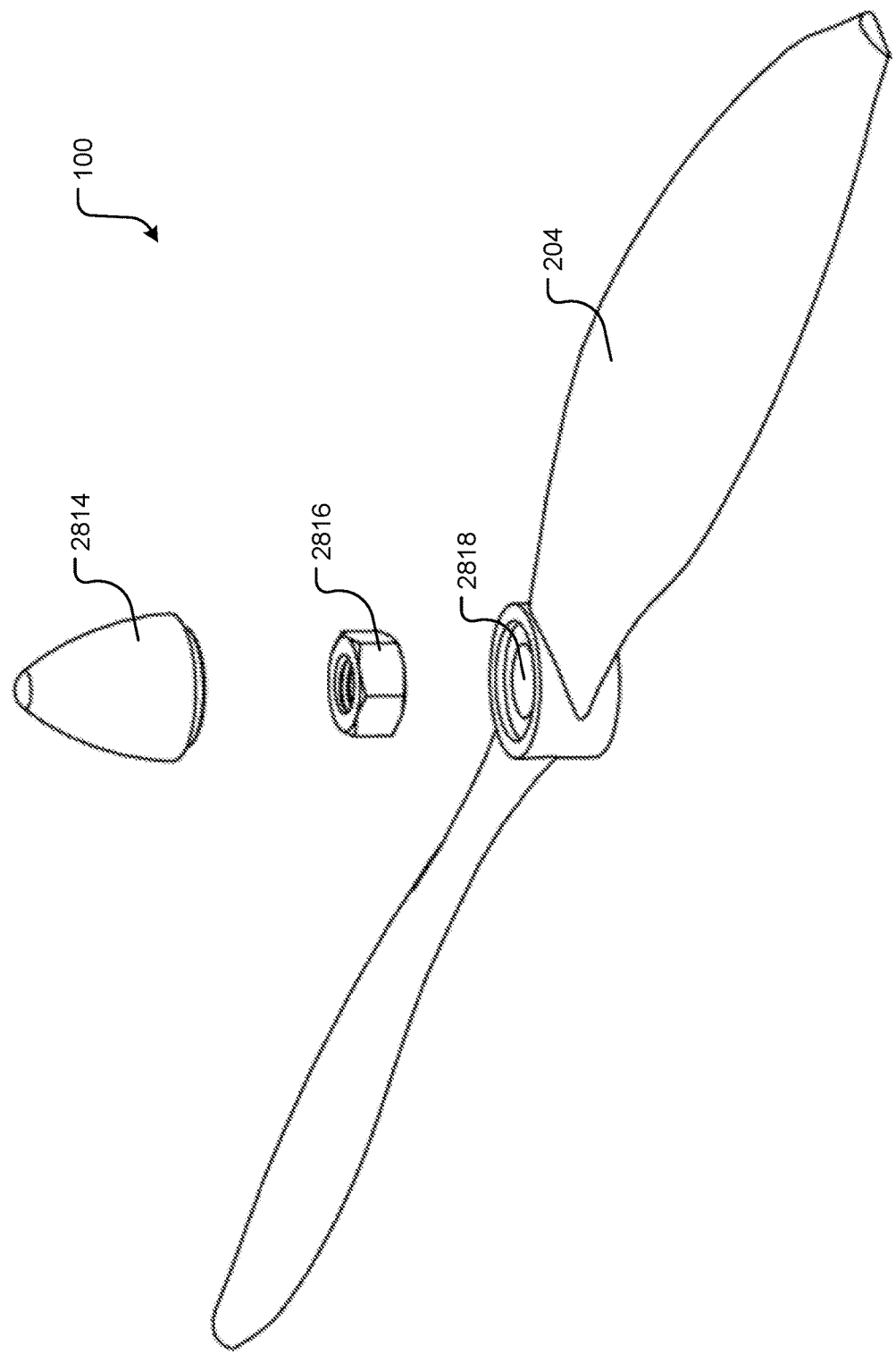
FIG. 39 illustrates an exploded view of a bladed component according to FIG. 38.

FIG. 39 illustrates an exploded view of a bladed component according to FIG. 38.

In particular, the aspects illustrated in FIG. 38 and FIG. 39 and/or described herein may include any one or more of the various other aspects described herein. Moreover, the aspects illustrated in FIGS. 1-37 and/or described herein may include one or more of the aspects illustrated in FIG. 38 and FIG. 39.

As illustrated in FIG. 38 and FIG. 39, the propeller 204 may include an end cap 2814. As illustrated in FIG. 39, the end cap 2814 may cover a fastener 2816 such as a nut or the like. The end cap 2814 may be configured to improve aerodynamics by having a shape with a lower coefficient of drag, which reduces aerodynamic drag, reduces thrust needed to maintain a desired flight envelope, increases efficiency, range, endurance, and/or the like. The end cap 2814 may attach to the propeller 204 with an adhesive, a fastener, a snap fit connection, and/or the like. The end cap 2814 may be formed of one or more metal materials, synthetic materials, plastic materials, reinforced plastic materials, and/or the like. In one aspect, the end cap 2814 may be molded, extruded, 3-D printed, machined, and/or the like.

The fastener 2816 may be fastened to the motor shaft 2860. In particular, the motor shaft 2860 may extend through an aperture 2818 of the propeller 204 and the fastener 2016 may securely fasten the propeller 204 to the motor shaft 2860. The propeller 204 may be formed of one or more metal materials, synthetic materials, plastic materials, reinforced plastic materials, and/or the like. In one aspect, the propeller 204 may be molded, extruded, 3-D printed, machined, and/or the like.

EXAMPLES

Example 1

A vectored thrust control module for an aircraft having an aircraft structure comprising: a stationary servo system that includes a motor and an output shaft, wherein the stationary servo system is configured to connect at the output shaft to a servo system output arm; a bladed component configured to rotate and provide thrust; and a thrust motor assembly mounted directly to the servo system output arm of the servo system, wherein the thrust motor assembly further includes a motor that is configured to rotate the bladed component.

Example 2

The vectored thrust control module according to example 1, wherein a thrust line of the thrust motor assembly aligns with a joint of the servo output shaft and frame receptacle, so as to minimize extraneous torques carried across the joint.

Example 3

The vectored thrust control module of any one of examples 1 to 2, further comprising an electronic speed control unit mounted to one of the following: a frame component on the aircraft structure or the servo system, and the electronic speed control unit further powers the servo via an integrated power conditioning circuit.

Example 4

The vectored thrust control module according to example 3, wherein the power conditioning circuit is coupled to the electronic speed control unit.

Example 5

The vectored thrust control module according to any one of examples 1 to 4, further comprising a bolt with a bolt shaft retained in a frame member to absorb extraneous torques.

Example 6

The vectored thrust control module according to any one of examples 1 to 5, wherein the thrust motor assembly and output arm are configured to rotate with 180 degrees of rotation about the hinge point between the stationary servo system and the output arm.

Example 7

The vectored thrust control module according to any one of examples 1 to 6, further comprising a mating receptacle for a servo output shaft of the servo, and a mating hole pattern for a motor base of the thrust motor assembly.

Example 8

The vectored thrust control module according to any one of examples 1 to 7, further comprising a locking mechanism coupled to an interface portion of an aircraft interface structure, the locking mechanism further comprising: a latching block with a receptacle, the receptacle configured to receive and slide along a structure arm; and a linear servo assembly mounted to the structure arm that is configured to move the latching block, wherein the locking mechanism prevents gimbaling of at least one of the following components: the thrust motor assembly, the servo system, and an adapter plate.

Example 9

The vectored thrust control module of example 8, further comprising an aircraft interface structure arm configured to provide clearance for the bladed component.

Example 10

A vectored thrust control module for an aircraft having an aircraft structure comprising: a stationary servo system that includes a motor coupled to the aircraft structure at a connection point; a bladed component configured to rotate and provide thrust; and a thrust motor assembly that includes a ducted fan that is configured to rotate the bladed component, wherein the thrust motor assembly is supported by a pivoting assembly on an opposite side of the servo system.

Example 11

The vectored thrust control module of example 10, wherein the thrust motor assembly includes a propeller bladed component.

Example 12

The vectored thrust control module according to any of examples 10 to 11, further comprising an output shaft of the servo connected to a mating receptacle of a thrusting assembly and held in place by a fastener.

Example 13

The vectored thrust control module according to any of examples 10 to 12, wherein a thrust line of the thrust motor assembly is aligned with a joint of a servo output shaft of the servo and a frame receptacle, so as to minimize extraneous torques carried across the joint.

Example 14

The vectored thrust control module according to any of examples 10 to 13, further comprising a bolt and bolt shaft retained in a frame member to absorb extraneous torques.

Example 15

The vectored thrust control module according to any of examples 10 to 14, wherein the servo system is configured to rotate with as much as 180 degrees of rotation about a hinge point, or as mechanically limited by the servo construction.

Example 16

The vectored thrust control module according to any of examples 10 to 15, further comprising an electronic speed control unit mounted to one of the following: a frame component on the aircraft structure or the servo system, and the electronic speed control unit further powers the servo via an integrated power conditioning circuit.

Example 17

The vectored thrust control module according to example 16, wherein the power conditioning circuit is a separate component from the electronic speed control unit.

Example 18

The vectored thrust control module according to example 10, further comprising a locking mechanism coupled to an interface portion of an aircraft interface structure, the locking mechanism further comprising: a latching block with a receptacle, the receptacle configured to receive and slide along a structure arm; and a linear servo assembly mounted to the structure arm configured to move the latching block, wherein the locking mechanism prevents gimbaling of any of the following components: the thrust motor assembly, the servo system, and an adapter plate.

Example 19

A vectored thrust control module for an aircraft having a sliding locking mechanism on an aircraft structure to prevent gimbaling during flight, comprising: an aircraft structure arm; an adapter plate; a tilting servo system that includes a motor coupled to the aircraft structure at a connection point; a bladed component configured to rotate and provide thrust; a thrust motor assembly that includes a motor configured to rotate the bladed component; a locking mechanism coupled to an interface portion of the aircraft interface structure; the locking mechanism includes a latching block with a receptacle, the receptacle configured to receive and slide along a structure arm; and a linear servo assembly mounted to the structure arm configured to move the latching block, wherein the locking mechanism prevents gimbaling of at least one of the following components: the thrust motor assembly, the servo system, and the adapter plate.

Example 20

The vectored thrust control module according to example 19, further comprising an electronic speed control unit mounted to one of the following: a frame component on the aircraft structure or the servo system, and the electronic speed control unit further powers the servo via an integrated power conditioning circuit.

Example 21

The vectored thrust control module according to any of examples 19 to 20, wherein the power conditioning circuit is a separate component from an electronic speed control unit.

Example 22

The vectored thrust control module of any of examples 19 to 21, wherein the thrust motor assembly and the servo are configured to rotate together with respect to the aircraft structure.

Example 23

The vectored thrust control module of any of examples 19 to 22, wherein the locking mechanism is configured to slide between two positions on the aircraft structure, wherein a first position allows the thrust motor assembly to freely rotate or gimbal, and wherein a second position is a locking position that locks one or more of the thrust motor assembly, the servo system, and the adapter plate.

Example 24

The vectored thrust control module according to any of examples 19 to 23, further comprising a bolt and bolt shaft retained in an aircraft frame member to absorb extraneous torques.

While aspects of the present disclosure have been particularly shown and described with reference to the aspects above, it will be understood by those skilled in the art that various additional aspects may be contemplated by the modification of the disclosed machines, systems and methods without departing from the spirit and scope of what is disclosed. Such aspects should be understood to fall within the scope of the present disclosure as determined based upon the claims and any equivalents thereof.

We claim:

1. An aircraft thrust system configured to be attached to an aircraft comprising:
    a servo system that includes a tilt motor and an output shaft, wherein the output shaft of the servo system is coupled to an aircraft structure at a connection point such that the servo system is supported by the output shaft and the servo system rotates with respect to the aircraft structure;
    a bladed component configured to rotate and provide thrust; and
    a thrust motor assembly that includes a thrust motor configured to rotate the bladed component to provide the thrust,
    wherein the thrust motor assembly is connected to and fully supported by the servo system;
    wherein the thrust motor assembly and the servo system are configured to be rigidly connected together and are further configured to rotate together with respect to the aircraft structure; and
    wherein the thrust motor assembly and the servo system are arranged such that a thrust line of the thrust motor assembly is aligned with the connection point between the servo system and the aircraft structure.

2. The aircraft thrust system according to claim 1, further comprising:
a shroud structure attached to the servo system and the shroud structure configured to at least partially surround the servo system and the shroud structure configured to reduce aerodynamic drag,
wherein the thrust motor assembly and the servo system rotate together about a pivot point.

3. The aircraft thrust system according to claim 1, further comprising:
an electronic speed control unit mounted to the servo system; and
a voltage regulator mounted to the servo system,
wherein at least one of the following are configured to provide power to the servo system: the electronic speed control unit or the voltage regulator; and
wherein the electronic speed control unit, the voltage regulator, the thrust motor assembly, and the servo system rotate together with respect to the aircraft structure.

4. The aircraft thrust system according to claim 1, further comprising:
an adapter plate configured to support the thrust motor assembly and the servo system,
wherein the adapter plate, the thrust motor assembly, and the servo system rotate together with respect to the aircraft structure.

5. The aircraft thrust system according to claim 1, wherein the thrust motor assembly is configured to rotate with respect to the aircraft structure about a rotational axis of the output shaft of the servo system.

6. The aircraft thrust system according to claim 1, further comprising:
an arm structure having a first end and a second end,
wherein the thrust motor assembly and the servo system are configured to be rigidly connected together such that the thrust line of the thrust motor assembly is aligned with a pivot line of the servo system;
wherein the first end of the arm structure is configured to be attached to the servo system; and
wherein the second end of the arm structure is configured to be attached to the aircraft.

7. The aircraft thrust system according to claim 6, further comprising:
a connector and latch mechanism attached to the second end of the arm structure and the connector and latch mechanism is configured to connect and disconnect the arm structure to the aircraft.

8. The aircraft thrust system according to claim 7, wherein the arm structure, the servo system, and the connector and latch mechanism are configured as a replaceable arm module.

9. An aircraft thrust system configured to be attached to an aircraft comprising:
a servo system that includes a tilt motor and an output shaft, wherein the output shaft of the servo system is coupled to an aircraft structure at a connection point such that the servo system is supported by the output shaft and the servo system rotates with respect to the aircraft structure;
a bladed component configured to rotate and provide thrust;
a thrust motor assembly that includes a thrust motor configured to rotate the bladed component to provide the thrust; and
an arm structure having a first end and a second end,
wherein the first end of the arm structure is configured to be attached to the servo system;
wherein the second end of the arm structure is configured to be attached to the aircraft;
wherein the thrust motor assembly is connected to and fully supported by the servo system;
wherein the thrust motor assembly and the servo system are configured to be rigidly connected together and are further configured to rotate together with respect to the aircraft structure;
wherein the servo system is configured to rotate with respect to the aircraft structure about a rotational axis of the output shaft of the servo system; and
wherein the rotational axis of the output shaft of the servo system is angled with respect to a longitudinal axis of the arm structure.

10. An aircraft comprising a plurality of aircraft thrust systems of claim 9 and each comprising a thrust motor and a bladed component; and each aircraft thrust system is configured to rotate about the output shaft of the servo system with respect to the aircraft structure.

11. An aircraft thrust system configured to be attached to an aircraft comprising:
a servo system that includes a tilt motor and an output shaft, wherein the output shaft of the servo system is coupled to an aircraft structure at a connection point such that the servo system is supported by the output shaft and the servo system rotates with respect to the aircraft structure;
a bladed component configured to rotate and provide thrust;
a thrust motor assembly that includes a thrust motor configured to rotate the bladed component to provide the thrust; and
an arm structure having a first end and a second end,
wherein the first end of the arm structure is configured to be attached to the servo system;
wherein the second end of the arm structure is configured to be attached to the aircraft;
wherein the thrust motor assembly is connected to and fully supported by the servo system;
wherein the thrust motor assembly and the servo system are configured to be rigidly connected together and are further configured to rotate together with respect to the aircraft structure; and
wherein the thrust motor assembly and the servo system are arranged such that a thrust line of the thrust motor assembly is aligned with the connection point between the servo system and the aircraft structure.

12. The aircraft thrust system according to claim 11, further comprising:
a shroud structure attached to the servo system and the shroud structure configured to at least partially surround the servo system and the shroud structure configured to reduce aerodynamic drag,
wherein the thrust motor assembly and the servo system rotate together about a pivot point.

13. The aircraft thrust system according to claim 11, further comprising:
an electronic speed control unit mounted to the servo system; and
a voltage regulator mounted to the servo system,
wherein at least one of the following are configured to provide power to the servo system: the electronic speed control unit or the voltage regulator; and wherein the electronic speed control unit, the voltage regulator, the thrust motor assembly, and the servo system rotate together with respect to the aircraft structure.

14. The aircraft thrust system according to claim 11, further comprising:
an adapter plate configured to support the thrust motor assembly and the servo system,
wherein the adapter plate, the thrust motor assembly, and the servo system rotate together with respect to the aircraft structure.

15. The aircraft thrust system according to claim 11, wherein the thrust motor assembly is configured to rotate with respect to the aircraft structure about a rotational axis of the output shaft of the servo system such that the thrust line of the thrust motor assembly is aligned with a pivot line of the servo system.

16. The aircraft thrust system according to claim 11, further comprising:
a connector and latch mechanism attached to the second end of the arm structure and the connector and latch mechanism is configured to connect and disconnect the arm structure to the aircraft.

17. The aircraft thrust system according to claim 16, wherein the arm structure, the servo system, and the connector and latch mechanism are configured as a replaceable arm module.

18. The aircraft thrust system according to claim 11, wherein the servo system is configured to rotate with respect to the aircraft structure about a rotational axis of the output shaft of the servo system.

19. An aircraft comprising a plurality of aircraft thrust systems of claim 18 and each comprising a thrust motor and a bladed component; and each aircraft thrust system is configured to rotate about the output shaft of the servo system with respect to the aircraft structure.

* * * * *